United States Patent
Su

(10) Patent No.: US 8,909,653 B1
(45) Date of Patent: Dec. 9, 2014

(54) APPARATUS, SYSTEMS AND METHODS FOR INTERACTIVE DISSEMINATION OF KNOWLEDGE

(71) Applicant: Su-Kam Intelligent Education Systems, Inc., Pasadena, CA (US)

(72) Inventor: Julius Su, Pasadena, CA (US)

(73) Assignee: Su-Kam Intelligent Education Systems, Inc., Pasadena, CA (US)

( * ) Notice: Subject to any disclaimer, the term of this patent is extended or adjusted under 35 U.S.C. 154(b) by 0 days.

(21) Appl. No.: 14/460,221

(22) Filed: Aug. 14, 2014

Related U.S. Application Data

(63) Continuation-in-part of application No. 13/367,264, filed on Feb. 6, 2012, now Pat. No. 8,832,117.

(51) Int. Cl.
  *G06F 17/30* (2006.01)
  *G09B 5/02* (2006.01)

(52) U.S. Cl.
  CPC ........................................ *G09B 5/02* (2013.01)
  USPC .......................................... 707/748; 707/705

(58) Field of Classification Search
  CPC ................... G06F 17/30292; G06F 17/30421
  USPC ................................................ 707/705, 748
  See application file for complete search history.

(56) References Cited

U.S. PATENT DOCUMENTS

| | | | | |
|---|---|---|---|---|
| 3,981,087 A | * | 9/1976 | Sachs | 434/308 |
| 5,506,937 A | * | 4/1996 | Ford et al. | 706/11 |
| 5,820,386 A | * | 10/1998 | Sheppard, II | 434/322 |
| 6,386,883 B2 | * | 5/2002 | Siefert | 434/322 |
| 6,493,690 B2 | * | 12/2002 | Bertrand et al. | 706/45 |
| 6,905,340 B2 | * | 6/2005 | Stansvik | 434/322 |
| 6,978,115 B2 | * | 12/2005 | Whitehurst et al. | 434/350 |
| 6,988,096 B2 | * | 1/2006 | Gupta et al. | 1/1 |
| 8,412,770 B2 | * | 4/2013 | Marcucci et al. | 709/204 |
| 8,423,392 B2 | * | 4/2013 | Moxley et al. | 705/7.14 |
| 8,516,379 B2 | * | 8/2013 | D'Angelo et al. | 715/751 |
| 8,645,398 B2 | * | 2/2014 | Xia et al. | 707/751 |
| 2008/0286737 A1 | * | 11/2008 | Cheng et al. | 434/322 |
| 2009/0049390 A1 | * | 2/2009 | Nason et al. | 715/747 |
| 2010/0281025 A1 | * | 11/2010 | Tsatsou et al. | 707/733 |
| 2012/0331390 A1 | * | 12/2012 | Kanjirathinkal et al. | 715/738 |

OTHER PUBLICATIONS

PCT—International Search Report, for International Applicaiton No. PCT/US2013/023881, mailed Jan. 30, 2013 (2 pages).*
PCT—Written Opinion of the International Searching Authority, for International Application No. PCT/US2013/023881, mailed Apr. 15, 2013 (7 pages).*

(Continued)

*Primary Examiner* — Cheryl Lewis
(74) *Attorney, Agent, or Firm* — Venkatesh Krishnamoorthy; Silicon Valley Patent Group LLP

(57) ABSTRACT

Embodiments of apparatus, systems and methods facilitate knowledge dissemination and promote knowledge acquisition, in part, by automatically presenting elements of an interlinked knowledge base to optimize learning efficiency. In some embodiments, a graphical user interface (GUI) facilitates user interaction with subject items, ordered arrangements of subject items, and display of subject items and their interconnections in the knowledge base. For example, the GUI facilitates operations such as the determination and display of: subject items with the same subject tag, and subject items with similar connectivity. Other operations facilitate simplification and modification of the displayed knowledge graph comprising the subject items.

20 Claims, 20 Drawing Sheets

(56) References Cited

OTHER PUBLICATIONS

"ALEKS: Knowledge Space Theory," retrieved from http://www.aleks.com/about_aleks/knowledge_space_therory on Jun. 23, 2012.*

"ALEKS: Overview of ALEKS," retrieved from http://www.aleks.com/about_aleks/overview on Jun. 23, 2012.*

"SuperMemo," retrieved from http://en.wikipedia.org/wiki/SuperMemo on Jun. 23, 2012.*

"Leitner system," retrieved from http://en.wikipedia.org/wiki/Leitner_System on Jun. 23, 2012.*

"Anki," retrieved from http://en.wikipedia.org/wiki/Anki on Jun. 23, 2012.*

"Spaced Repetition," retrieved from http://en.wikipedia.org/wiki/Spaced_repetition on Jun. 23, 2012.*

P.A. Wozniak, "SuperMemo 2: Algorithm," Chapter 3.2 "Application of a computer to improve the results obtained in working with the SuperMemo method," retrieved from http://www.supermemo.com/english/ol/sm2.htm on Jun. 23, 2012.*

Eduardo Guzman and Ricardo Conejo, "A Brief Introduction to the New Architecture of Siette," appears in Lecture Notes in Computer Science 3137, p. 405-408, W. Nejdl and P. De Bra (Eds.): AH 2004, Springer-Veriag, Berlin Heidelberg, 2004.*

Marcus Specht and Reinhard Oppermann, "ATS—Adaptive Teaching System a WWW-based ITS," appears in "Proceedings of Workshop Adaptivitat und Benutzermodellierung in Interaktiven Softwaresystemem: ABIS 98," U. Timm (Eds.), 1998.*

Alenka Kavcic, Marko Privosnik, Matija Marolt and Sasa Divjak, "Educational Hypermedia System ALICE. An Evaluation of Adaptive Features," appears in "Advances in Multimedia, Video, and Signal Processing Systems, (Electrical and Computer Engineering Series) WSEAS," p. 71-76, 2002.*

Nigel Ford, "Levels and types of mediation in instructional systems: an individual differences approach," International Journal of Human-Computer Studies (1995), vol. 43, p. 241-259, 1995.*

K. Kabassi and M. Virvou, "Multi-attribute utility theory and adaptive techniques for intelligent web-based educational sofware," Instructional Science (2006), vol. 34, p. 131-158, Springer, 2006.*

Gustaf Neuman and Jana Zirvas, "SKILL—A Scalable Internet-Based Teaching and Learning System," WebNet 98, Proceedings of the World Conference on the WWW, Internet, and Intranet, p. 688-693, Orlando, FL. Nov. 7-12, 1998.*

Markek Obitko, Lubomir Kurz, and Igor Glucksmann, "A Framework for Constructing Adaptive Web-Based Educational Systems,"Neuraigen Intelligent Turtoring, Poster Presentation, 2001.*

Hossein Sadat and Ali A. Ghorbani, "On the Evaluation of Adaptive Web Systems," Proceedings of the Workshop on Web-based Support Systems (2004), p. 127-136, 2004.*

Cornelia E. Dowling, "On the Irredundant Generation of Knowledge Spaces," Journal of Mathematical Psychology, vol. 37, p. 49-62, 1993.*

Cornelia E. Dowling, "Applying the Basis of a Knowledge Space for Controlling the Questioning of an Expert," Journal of Mathematical Psychology, vol. 37, p. 21-48, 1993.*

Eric Cosyn and Nicolas Thiery, "A Practical Procedure to Build a Knowledge Structure," Journal of Mathematical Psychology, vol. 44, p. 383-407, 200.*

Cord Hockemeyer, "Using the Basis of a knowledge Space for Determining the Fringe of a Knowledge State,", Journal of Mathematical Psychology, vol. 41, p. 275-279, 1997.*

Stacey Kaye and Jennifer Flynn, "Evaluating an adaptive computer system for teaching about decimals: Two case studies," appears in 11th International Conference on Artificial Intelligence in education (AIED03) Online Supplementary Proceedings, Workshop on Advanced technologies for Mathematics Education, 2003, available at http://sydney.edu.au.*

Yong Lian, "Adaptive Teaching for Large Classes," International Conference on Engineering Education Jul. 21-25, 2003, Valencia, Spain.*

Marek Obitko, Lubomir Kurz, and Igor Glucksmann, "A Framework for Constructing Adaptive Web-Based Educational Systems," Neuralgen Inelligent Tutoring, Poster Presentation. No Date.*

* cited by examiner

APPARATUS, SYSTEMS AND METHODS FOR INTERACTIVE DISSEMINATION OF KNOWLEDGE

CROSS-REFERENCE TO RELATED APPLICATION(S)

This application is a continuation-in-part of U.S. patent application Ser. No. 13/367,264, filed Feb. 6, 2012, issued as U.S. Pat. No. 8,832,117, entitled "Apparatus, Systems and Methods for Interactive Dissemination of Knowledge," which is assigned to the assignee hereof, and which is incorporated by reference herein in its entirety.

BACKGROUND

1. Field of the Invention

The present invention relates to the field of education and in particular, to apparatus, systems, and methods for facilitating knowledge dissemination and promoting knowledge acquisition, in part, by automatically presenting elements of an interlinked knowledge base in a way that optimizes learning efficiency.

2. Description of Related Art

Knowledge may be viewed as a collection of concepts, models, facts and tools pertaining to subject matter, which are interlinked and rich with dependencies. Good educators know it is not enough to teach a subject as a collection of unrelated facts—instead, presenting ideas in a manner which makes students aware of the connections between ideas facilitates a transition from memorization and superficial understanding of the subject to true learning.

Effective instruction involves a presentation of concepts selected, sequenced, and timed so as to be congruent with a student's learning state, which may be seen as a function of the student's interests, abilities, and prior knowledge. For example, basic principles may be introduced to lay the groundwork for more advanced formulations; examples may be provided to reinforce key points; and old concepts may be reviewed, while introducing new ones in a way that maintains a student's interest.

Because students can vary widely in their learning states, the presentation of concepts in a manner that facilitates effective learning will likewise vary between students. However, in a conventional school setting, students in a class are exposed uniformly to the same sequence of topics over time, which severely constrains learning because a progression of ideas that may enlighten one student will likely perplex another. Moreover, learning state variations between students are likely to be accentuated as budgetary constraints and various economic factors contribute to accelerating the trend toward larger class sizes and higher student-teacher ratios at many schools, thereby decreasing the likelihood of student success.

Computer-assisted teaching has been used to provide a customized learning experience to individuals, making it more feasible to effectively teach large numbers of students with varied learning states. Typically, teachers create a database of subject items, and a computer system may permit students to pick from a variety of subject items to aid understanding. Students may also be permitted to repeat subject items to reinforce understanding.

However, while conventional computer aided teaching systems are good at covering narrow subjects with disjoint concepts, they are poor at covering broader subjects that include complex connections between ideas. For example, conventional computer aided teaching systems are more effective at teaching vocabulary than language; more effective at teaching multiplication tables than algebra; and more effective at teaching dates of historical events than history. Current teaching systems focus on retention and fail to adequately address the connections between concepts, thereby favoring memorization over learning.

Thus, there is a need for apparatus, systems and methods that facilitate interactive learning through an adaptive and automated progression through an interlinked knowledge base, in a way that promotes both the understanding of individual items, and the connections between them, and in a sequence designed to maintain, reinforce, and advance student knowledge over time.

SUMMARY

Consistent with embodiments disclosed herein, apparatus, systems and methods for facilitating the dissemination of knowledge and the promotion of knowledge acquisition are presented. In some embodiments, a method for facilitating the dissemination of content associated with a plurality of linked In some embodiments, a processor-implemented method for displaying content associated with a plurality of linked subject items in a knowledge base may comprise: obtaining and displaying a learning path comprising an ordered set of subject items in the knowledge base, determining a set of linked subject items comprising at least one of a set of basic subject items or a set of advanced subject items, wherein each subject item in the set of linked subject items is linked to at least one subject item on the learning path, and displaying representations of a subset of the linked subject items selected from the set of linked subject items. In some embodiments, the displayed representation for a first subject item in the subset may be determined based, in part, on at least one of: a proximity of the first subject item to a subject item on the learning path, or a value of a first property associated with the first subject item, or a value of a second property associated with a second subject item directly linked to the first subject item.

Embodiments disclosed also pertain to an apparatus comprising: a memory to hold a knowledge base comprising a plurality of subject items; a display; and a processor coupled to the memory and the display. In some embodiments, the processor may be configured to: obtain a learning path comprising an ordered set of subject items in the knowledge base; determine a set of linked subject items comprising at least one of a set of basic subject items or a set of advanced subject items, wherein each subject item in the set of linked subject items being linked to at least one subject item on the learning path; and display, on the display, the learning path and representations of a subset of the linked subject items selected from the set of linked subject items. In some embodiments, the displayed representation for a first subject item in the subset may be determined based, in part, on at least one of: a proximity of the first subject item to a subject item on the learning path, or a value of a first property associated with the first subject item, or a value of a second property associated with a second subject item directly linked to the first subject item.

In some embodiments, an apparatus may comprise: memory means to hold a knowledge base comprising a plurality of subject items; a display means; and means for obtaining a learning path comprising an ordered set of subject items in the knowledge base; means for determining a set of linked subject items comprising at least one of a set of basic subject items or a set of advanced subject items, wherein each subject item in the set of linked subject items being linked to at least one subject item on the learning path; and means for displaying, on the display means, the learning path and representations of a subset of the linked subject items selected from the set of linked subject items. In some embodiments, the displayed representation for a first subject item in the subset may be determined based, in part, on at least one of: a proximity of the first subject item to a subject item on the learning path, or a value of a first property associated with the first subject item, or a value of a second property associated with a second subject item directly linked to the first subject item.

In some embodiments, a non-transitory computer-readable medium may comprise instructions, which, when executed by a processor, perform steps in a method for displaying content associated with a plurality of linked subject items in a knowledge base, where the steps may comprise: obtaining and displaying a learning path comprising an ordered set of subject items in the knowledge base, determining a set of linked subject items comprising at least one of a set of basic subject items or a set of advanced subject items, wherein each subject item in the set of linked subject items is linked to at least one subject item on the learning path, and displaying representations of a subset of the linked subject items selected from the set of linked subject items. In some embodiments, the displayed representation for a first subject item in the subset may be determined based, in part, on at least one of: a proximity of the first subject item to a subject item on the learning path, or a value of a first property associated with the first subject item, or a value of a second property associated with a second subject item directly linked to the first subject item.

Embodiments also relate to software, firmware, and program instructions created, stored, accessed, or modified by computers and/or processors using computer-readable media or computer-readable memory. The methods described may be performed on various computing devices including distributed computing systems such as clouds.

These and other embodiments are further explained below with respect to the following figures.

DETAILED DESCRIPTION

Consistent with embodiments disclosed herein, apparatus, systems and methods for facilitating knowledge dissemination and promoting knowledge acquisition are presented.

Figure 1:
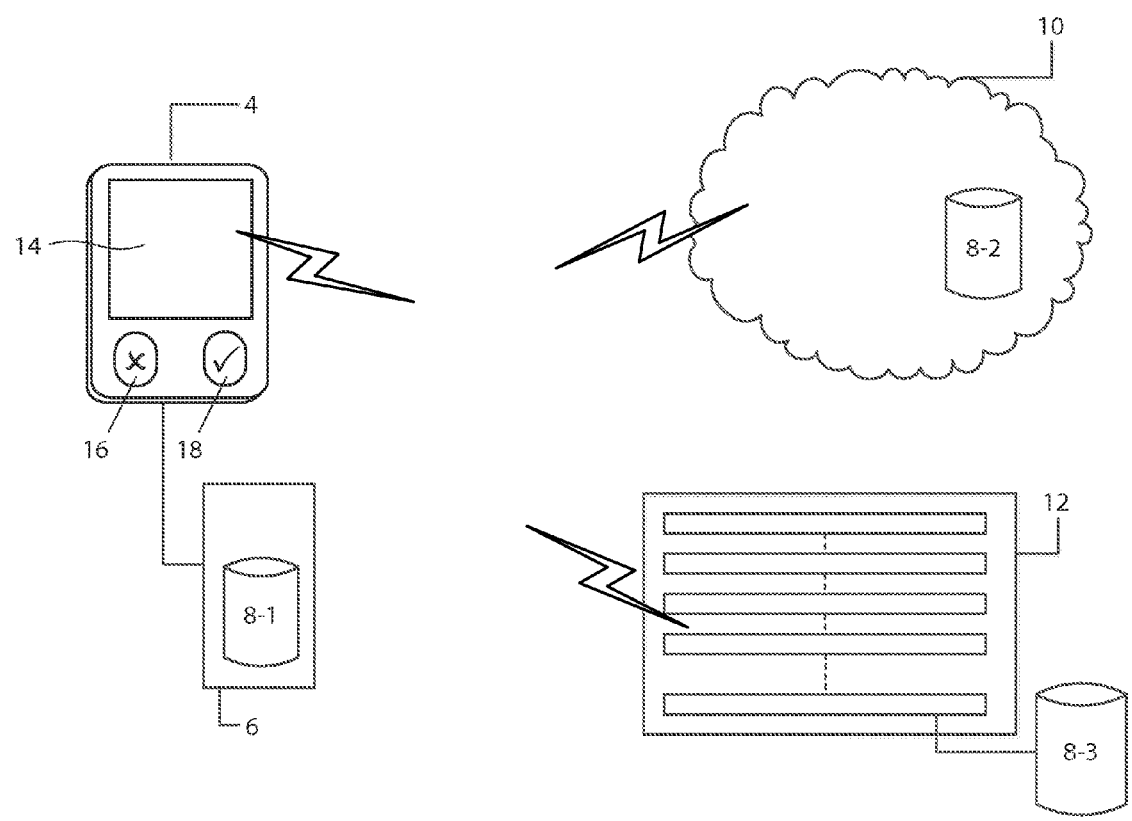
FIG. 1 shows a block diagram illustrating an exemplary system for facilitating the dissemination of knowledge and the promotion of knowledge acquisition.

FIG. 1 shows a block diagram illustrating an exemplary system 2 for facilitating knowledge dissemination and promoting knowledge acquisition. As shown in FIG. 1, exemplary system 2 may include computing device 4, which may be coupled to storage 6 comprising knowledge base 8-1. Further, computing device 4 may also be coupled through a wired network or wirelessly to computing platforms cloud 10 and/or server farm 12. In some embodiments, the computing platform may take the form of computing device 4, which may form a self-contained computing platform with local storage 6 and a locally hosted knowledge base 8 that is capable of independently implementing a method for facilitating knowledge dissemination and promoting knowledge acquisition in a manner consistent with disclosed embodiments.

In some embodiments, computing device 4 may take the form of a desktop, laptop, and/or a tablet computer, a smart phone, a handheld computing device, or a special purpose apparatus that facilitates knowledge dissemination and acquisition in a manner consistent with embodiments disclosed herein. In general, computing device 4 may be a multifunction device, i.e. cell phone, smart phone, audio player, personal digital assistant, portable gaming device, electronic book reader, handheld computing device, laptop, or desktop machine, which are often capable of displaying a rich variety of media, such as audio, animation, three-dimensional graphics, and may even generate smells and provide tactile response. In some embodiments, one or more of the above display and/or sensory modes in computing device 4 may be used to enhance knowledge dissemination and promote knowledge acquisition. In some embodiments, computing device 4 may also comprise non-volatile memory capable of storing program code, operating systems, knowledge bases, etc.

Computing device 4 may have one or more processors, including a Central Processing Unit ("CPU") and may be able to communicate wirelessly with cloud 10 and server farm 12. Wireless communication may occur over Wi-Fi (based on the IEEE 802.11 family of standards or variants thereof) using wireless access points and/or over mobile communication networks such as 3rd Generation mobile telecommunication ("3G") and/or $4^{th}$ Generation mobile telecommunication ("4G") networks (such as Long Term Evolution ("LTE"), LTE Advanced, or Wi-Max and variants thereof) using one or more supported communication protocols. Computing device 4 may also be able to communicate with other computers and/or storage media 6 over traditional wired networks. Computing device 4 may include a variety of ports for communication including Ethernet ports, Universal Serial Bus ("USB") ports, Serial Advanced Technology Attachment ("SATA"), etc.

Storage 6 may take the form of computer readable media, such as hard drives, solid state drives, optical media, memory cards, flash drives, etc. Computing device 4 may be able to read and write from storage 6 using an appropriate port on computing device 4. In some embodiments, storage 6 may be physically housed along with computing device 4 in an integrated body, case, or housing. In some embodiments, storage 6 may be external to computing device 4 and coupled to computing device 4 through an appropriate port on computing device 4. In some embodiments, storage 6 may also host knowledge base 8-1.

In general, knowledge bases 8 may include content associated with various subject items, the linkages between subject items, and one or more parameters that control the operation of modules implementing a teaching algorithm that presents content to users. In some embodiments, portions of knowledge bases 8 may also be present on storage media or non-volatile memory on computing device 4. In some embodiments, knowledge bases 8, or databases associated with knowledge bases 8 may store user profiles, which may include understanding levels, linkage strengths, time decay parameters, item accession time stamps, subject preferences and/or other teaching parameters associated with one or more users. User profiles may be used by modules implementing the teaching algorithm to present appropriate content.

Computing device 4 may use a liquid crystal display 14 to display content and receive user feedback using buttons 16 and 18 on computing device 4. Although exemplary computing device 4 has been shown with user input buttons 16 and 18, it should be noted that various other input schemes and user interfaces may be used. In some embodiments, a physical or virtual (on-screen) keyboard may be provided, a touch screen interface may be used to receive user input, and/or computing device 4 may respond to voice commands received by the user.

In some embodiments, modules implementing a teaching algorithm on computing device 4 may receive user input in response to questions posed to the user or input solicited from the user. In some embodiments, an answer/explanation stage may be presented after questions are posed to the user and based, at least in part, on user input.

For example, a student may be presented with questions relating to a subject item and may be asked to respond by pressing button 16 to indicate interest in the question; or by pressing button 18 to indicate disinterest, which may cause another lower priority question to be displayed instead. If the student indicates interest by pressing button 16, the answer/ explanation content relevant to the displayed question may be presented. If a student continues to reject questions associated with lower priority subject items as uninteresting, then, in some embodiments, the system may eventually present answer/explanation content related to the lowest priority subject item after all other candidate subject items have been rejected. Candidate subject items may be used to describe those subject items whose content may potentially be presented next to a user in a method for facilitating knowledge dissemination and promoting knowledge acquisition.

After the answer/explanation content of the subject item is presented, an overall comprehension input may be indicated by the user, for example, by pressing button 16 and/or button 18. In some embodiments, the system may automatically determine a comprehension input based on user responses to content related questions. Typically, a user's comprehension input at a moment in time is used to update an understanding level. In some embodiments, the understanding level for a specific user at a point in time may be computed as a function of the user's comprehension input. The understanding level may vary over time between user comprehension inputs, depending on the user's memory and ability to retain understanding of presented concepts with the passage of time. Accordingly, in some embodiments, user-specific understanding levels, when recomputed at various points in time, may take on different values reflecting changes to the user's memory and understanding at those points in time. In some embodiments, a time variation modification parameter, such as an understanding decay time parameter, may modify how user-specific understanding levels vary with time. The user's comprehension input upon presentation of a subject item may be viewed as the selection of a point (X, Y) in a space spanned by two axes representing a level of interest in the question (X-axis) and a degree of comprehension of the answer/explanation (Y-axis).

In some embodiments, system 2 may include knowledge bases 8 on storage resident on and/or coupled to a computing platform, such as knowledge base 8-2 on cloud 10 and/or knowledge base 8-3 on server farm 12. In one embodiment, a large number of subject items may be accessed by computing device 4 from knowledge bases 8-2 and/or 8-3. For example, computing device 4 may download and locally cache those subject items of immediate interest to the user and/or those that are likely to be accessed by the user because of their linkages to subject items previously accessed by the user in a recent prior time period from knowledge bases 8-2 and/or 8-3. In some embodiments, a user profile may also influence the downloading of content related to subject items likely to be of interest to the user.

In some embodiments, computing platforms such as server farm 12 and/or cloud 10 may include a large number of servers with sufficient bandwidth and storage to support the hosting of large knowledge bases 8-3 and 8-2, respectively. In one embodiment, users may be permitted to upload new content or annotate content pertaining to subject items to knowledge bases 8-1, 8-2, and/or 8-3. In some embodiments, other users may be able to access the new or annotated content, based, in part, on policies of the content provider and/or access criteria set by author of the new or annotated content.

The running of applications, or the provision of services, on networked, reliable, highly available, and scalable software and hardware infrastructures is termed "cloud computing". Cloud 10 facilitates the provision of services to support modules implementing the teaching application on computing device 4 using cloud computing. For example, access to and dissemination of content from knowledge base 8-2 may be supported by cloud 10. Algorithms to update teaching parameters taking into account data aggregated from multiple users may also be supported by cloud 10. Cloud computing may involve "public clouds", which provide on-demand access to high performance computing capabilities over the Internet. Amazon™ EC2, Terremark™, Rackspace™, and Savvis™ are examples of publicly available clouds. In some instances, cloud 10 may be realized by an organization using virtualization to convert one or more private data-centers into "private clouds". Cloud 10 refers to both public and private clouds. Clouds may use virtualization and/or sophisticated systems management solutions to provide a flexible, fault tolerant, and highly available view of underlying resources so that dedicated hardware resources can be dynamically shared across several users instead of being assigned individually.

In general, cloud 10 may be set up as virtualized or physical compute clusters to facilitate access to computing resources over the Internet through Web browser-based or client-side applications. Cloud computing resources and services, such as the interaction with knowledge base 8-2, may be facilitated through the use of Application Programming Interfaces ("APIs") and/or self service portals, such as websites accessed using a web browser on computing device 4. In one embodiment, modules running a knowledge dissemination and acquisition application on computing device 4 may include a local client side application to access and interact with a computing platform based application, such as a cloud based or server farm based application that provides and disseminates content stored in knowledge base 8-2, and/or provides back-end processing needed to update teaching parameters taking into account aggregate data gathered from multiple users. In some embodiments, the results of computations performed on the computing platform, such as on cloud-based or server-farm based applications may be displayed on computing device 4. In general, an application implementing a method to facilitate knowledge dissemination and promoting knowledge acquisition may be distributed between one or more of computing device 4, and a variety of computing platforms such as cloud 10, and/or server farm 12, using one or more knowledge bases 8.

Figure 2:
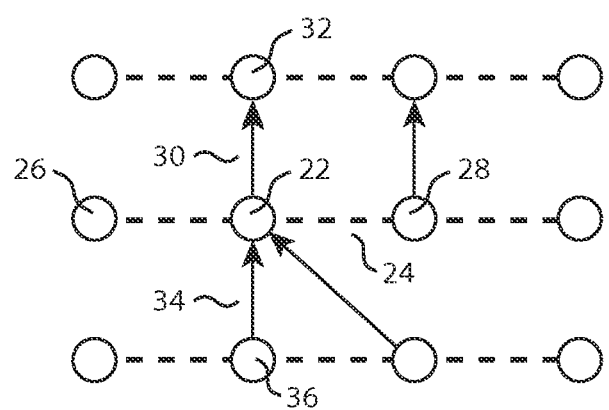
FIG. 2 shows an exemplary representation of a portion of a knowledge base, illustrating subject items, connections between subject items and exemplary associated parameters.

FIG. 2 shows an exemplary representation 20 of a portion of a knowledge base, illustrating subject items, the linkages between subject items, and associated parameters. In some embodiments, knowledge base 8 may be modeled in a manner similar to representation 20. In general, knowledge base 8 may include content associated with various subject items, the linkages between subject items, and one or more parameters that control the operation of modules implementing a teaching algorithm that presents content to users.

In some embodiments, knowledge base 8 may include one or more databases of subject items, and each subject item may be associated with a unique identifier ("UID"). These database(s) may also include a variety of other fields or tags associated with a subject item, which explicitly or implicitly detail a subject item's relationship with other subject items. In some embodiments, the content associated with each subject item may include two fields: (1) a question, prompt, title, topic, and/or partially completed concept and (2) an answer, explanation, and/or fully completed concept. In some embodiments, the answer, explanation, and/or concept may include follow-up questions, or use other methods to solicit input from the user to aid and/or gauge understanding of the material being presented. The content fields may take on a variety of formats including, but not limited to, strings of characters encoded in a common digital representation (e.g. ASCII or UTF-8), bitmap or vector image representations, hypertext markup language, metadata, file pointers, compressed or uncompressed data, audio representations, video representations, interactive components, or interpreted or compiled executable codes.

In some embodiments, knowledge base 8 may also include a database of links between subject items. As shown in FIG. 2, subject item 22 may be associated with three different types of links. Lateral link 24 associates related subject item 22 with other items of similar difficulty, complexity, and/or scope, such as items 26 and 28, while advanced link 30 associates subject item 22 with a more advanced item, such as item 32, and basic link 34 associates subject item 22 to a more basic subject item, such as subject item 36. Because subject item 32 is a more advanced item than subject 22, advanced link 30 may indicate that understanding of subject item 22 is a prerequisite or may aid in the understanding of subject item 32. Similarly, subject item 36 may aid in the understanding of subject item 22. Links may be assumed to be symmetric, so that if subject item 36 is linked as a basic subject item to subject item 22, then subject item 22 is linked as an advanced subject item to 36 as well; and, if subject item 22 is linked laterally to subject item 26, then subject item 26 is linked laterally to subject item 22 as well.

In one embodiment, links are stored by associating each item with a list of UID's of linked subject items categorized by link type (advanced, lateral, or basic). In other embodiments, compression methods that take advantage of the particular structure of a specific knowledge base may be used to save space and make searching and traversing the elements faster. For example, a cluster of subject items which are densely interlinked by lateral connections may be labeled with a "group tag" or "subject tag" identifying the cluster. Then any two ideas with the same subject tag may be implicitly assumed to be linked with a lateral connection.

Knowledge base 8 may also include various parameters used by modules implementing a teaching or knowledge dissemination/acquisition algorithm, for example, interest and understanding levels on a per item and/or per link basis; one or more time variation modification parameters, for example decay time constants, on a per subject item and/or per link basis, which may provide an individualized indication of the rate at which a user's understanding and/or interest levels are predicted to vary with time; a history of times the user has previously accessed one or more subject items; a history of previous user inputs, etc. In some embodiments, parameters associated with subject items may be distributed and/or averaged over related subject items to derive coarser-grained parameters associated with collections of subject items. A collection of parameters associated with a particular user is termed a user profile.

In some embodiments, knowledge bases 8 may be used by multiple users. In one instance, computing device 4 may be operated by one user at a time, with switching between users performed using a login/logout procedure. In another instance, system 2, computing device 4, and/or knowledge bases 8 may be used/accessed by multiple users simultaneously. In some embodiments, system 2 may store and/or use multiple user profiles in/from knowledge base 8.

In some embodiments, parameters used by system 2 and stored in knowledge bases 8 and the updating thereof could be influenced by parameters and/or inputs associated with other users. For example, in some embodiments, collective rankings could be operative in a community learning environment, so that subject items that other users have comprehended and found interesting would rise in rank and be preferentially presented to a user, while less comprehensible and/or disliked items would be hidden. In some embodiments, computing device 2 may display a user's progress relative to other users in the form of detailed distributions, rankings, or points, which may be used to stimulate competition or to provide a basis for external incentives and rewards.

Further, more complex methods of assembling the knowledge base are possible and envisaged. For example, subject items may be tailored to individual devices and/or users, and the accessibility of subject items may vary with users. In some embodiments, knowledge base 8 may be updated asynchronously and/or incrementally using continuing contributions from disparate users. Further, various well-known database representations may also be used to more efficiently index, store, access, and modify content, linkages, and parameters of knowledge base 160.

Figure 3:
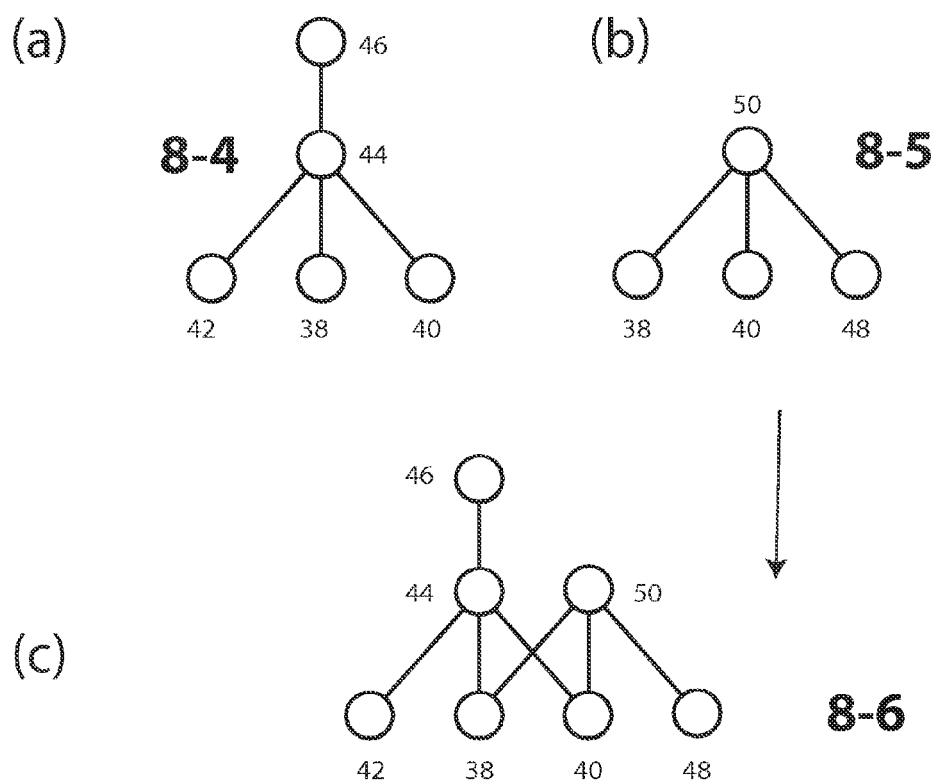
FIGS. 3(a)-(c) illustrate an exemplary use of unique ID numbers to identify distinct subject items and facilitate the creation and merging of disparate knowledge bases.

FIGS. 3(*a*)-(*c*) illustrate how the use of unique identifiers (UIDs) to identify distinct subject items may facilitate the creation and merging of different knowledge bases. In the example shown, subject items 38 and 40 are common to exemplary knowledge bases 8-4 and 8-5. Knowledge base 8-4 comprises subject items 38, 40, 42, 44 and 46; while knowledge base 8-5 comprises subject items 38, 40, 48 and 50. By taking one of the knowledge bases, such as knowledge base 8-4, adding new subject items (e.g. 48 and 50) from knowledge base 8-5, adding the linkages for each subject item in knowledge base 8-5, and using common subject items 38 and 40, the knowledge bases may be combined.

In some embodiments, users can also collaboratively edit ideas via a "wiki" interface, which permits users to add, edit, or delete elements to/from a global database, subject to version tracking and later revision by other users. Further, in other embodiments, computing devices 4 enabled with Internet connectivity can automatically update themselves to stay current. News stories and journal articles, or new knowledge bases written by publishing companies or Internet users, can be downloaded automatically. In some embodiments, items with connectivity information, but without content—stubs—can be downloaded regularly to a student's teaching device. Then, when a user reaches a point where the stubs would be presented based on the material the user understands, the device can prompt the user for further downloading or purchase of the additional material thereby keeping the user informed of available knowledge without unduly consuming memory or using network bandwidth.

A wide range of subjects can be translated into a knowledge base format. For example, a knowledge base could contain musical compositions to study, with basic tunes that build up to more advanced ones. In some instances, for more complex subjects, the system may be used as a teaching aid in conjunction with a live teacher. For example, a music teacher could store a collection of piano exercises in knowledge base 8. After a student has played several pieces, the teachers' assessment of the student's performance may be input into knowledge base 8, and the system may output the next piece for the student to perform based on the assessment. In some embodiments, computing device 4 may be used to request a live teacher when the system flags one or more subject items as particularly problematic for a student.

Figure 4:
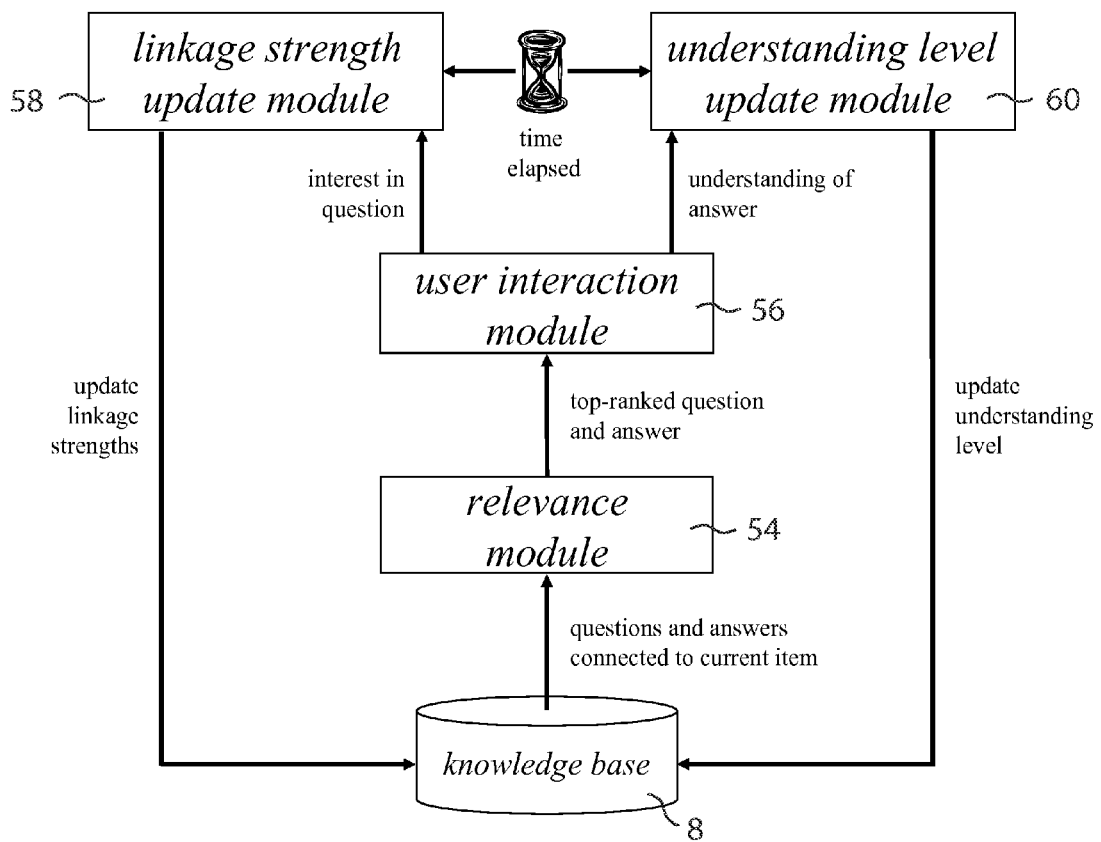
FIG. 4 shows a block diagram illustrating an exemplary software architecture of a system for facilitating knowledge dissemination and promoting knowledge acquisition.

FIG. 4 shows a block diagram illustrating an exemplary architecture 52 of a system for facilitating knowledge dissemination and promoting knowledge acquisition. In some embodiments, one or more knowledge bases 8 may store content and other information pertaining to subject items for users. For example, knowledge base 8 may include questions or topics pertaining to one or more current subject items and corresponding answers or explanations.

In some embodiments, exemplary relevance module 54 may create a candidate list comprising a list of candidate subject items relevant to a user's learning state, and compute for each subject item on the candidate list one or more priority values. Inclusion of a subject item on the candidate list, and the specific value of priority assigned, may be dependent on values of various parameters stored in knowledge base 8, such as (but not limited to) user understanding values and linkage strengths associated with the subject items and linked subject items at that point in time. In general, various data structures other than lists may be used to store candidate subject items, as would be apparent to one of ordinary skill in the art.

In some embodiments, exemplary relevance module 54 may decide whether or not to add a subject item i to its candidate list by applying one or more criteria based on the student's understanding of the subject item and related subject items. For example, one criterion may involve only adding subject item i to the candidate list if its understanding value $U_i$ falls below a fixed threshold. An additional criterion to add subject item i to the candidate list may be based on a weighted average understanding of all basic subject items linked to subject item i being above some understanding threshold, and/or a weighted average understanding of all advanced subject items linked to subject item i being below some understanding threshold. In some embodiments, the weights in the weighted average are the linkage strengths $C_{ij}$, between subject items i and j, so that a basic subject item j that was more strongly linked to the current candidate subject item i would have more influence on whether or not the current candidate subject item i was ultimately presented to the user.

In some embodiments, relevance module 54 may compute all linkage strengths $C_{ij}$ and understanding levels $U_i$ stored in knowledge base 160 that are involved in the computation of candidate subject item inclusion criteria and candidate subject item priority values using a model of how student interest and understanding are expected to change over time. Such a model may be based on the past history of user inputs and variable values, the time elapsed since the last user input associated with one or more items, and/or time variation modification parameters. For example, along with understanding $U_i$, knowledge base 8 may store a time variation modification parameter termed an understanding decay time parameter $\tau_i$, providing an indication of the rate of which the understanding level of subject item i, $U_i$, is expected to deteriorate over time. The understanding decay time $\tau_i$, may be updated each time positive or negative comprehension of subject item i is input by the user. Higher $\tau_i$ values are often associated with more persistent memories. In another example, along with linkage strength $C_{ij}$, knowledge base 8 may store a time variation modification parameter termed a linkage perturbation decay time $\tau_{ij}$ providing an indication of the rate at which perturbations to $C_{ij}$ are predicted to diminish over time. The linkage perturbation decay time $\tau_{ij}$ may be updated each time positive or negative interest in item i and/or item j is input by the user. Higher $\tau_{ij}$ values are associated with repeated and consistent interest or disinterest in the linkage between two items. Accordingly, as described above, in some embodiments, relevance module 54 may use time variation modification parameters, for example decay times, to compute values of $U_i$ and $C_{ij}$, used in computing weighted averages of understanding values which are part of criteria for determining candidacy and computing priority values.

In some embodiments, exemplary relevance module 54 may determine for a candidate subject item i an associated priority value $P_i$. The priority value $P_i$ may be computed as a function of the understanding value $U_i$ stored in knowledge base 8, computed at the current time. Other learning variables stored in knowledge base 8, such as a bias parameter $\gamma_i$, or a random jitter value $J_i$, may further modify the priority value $P_i$. In some embodiments, relevance module 54 may pass the UIDs associated with one or more high priority candidate subject items to user interaction module 56.

In some embodiments, user interaction module 56 may retrieve content associated with the UIDs related to one or more items on the candidate list, and determine user interest in the items, which may be presented either sequentially (e.g. one-at-a-time) or simultaneously (e.g. in a list format). In some embodiments, based on the current and/or previous user interest inputs, linkage strength update module 58 may then update one or more linkage strengths $C_{ij}$ between the currently presented candidate subject items i and related subject items j, as well as one or more time variation modification parameters, for example, linkage perturbation decay parameter $\tau_{ij}$ which affects how linkage strength $C_{ij}$ is assumed to change with time. In some embodiments, user interest inputs may be time stamped to record the time of input and to aid in the estimation of $C_{ij}$ at later points in time.

Once the user has indicated interest in a subject item i on the candidate list, the user interaction module 56 retrieves the answer/explanation content pertaining to the subject item from knowledge base 8, presents it to the user, and determines the degree to which the user comprehends the answer/explanation. This assessment can be made through self-evaluation, i.e. direct input, or via a programmatic comparison between one or more user inputs and a pre-stored template, e.g. multiple-choice questions, interactive tasks, or via a more complex programmatic evaluation, e.g. handwriting recognition, speech processing, etc. In some embodiments, based on the current and/or previous comprehension inputs, item understanding update module 60 may then update the understanding level $U_i$ of the currently presented candidate subject item i, as well as one or more time variation modification parameters, for example a time decay parameter $\tau_i$, which affects how understanding level $U_i$ is expected to change with time. In some embodiments, comprehension inputs may be time stamped to record the time of input and to aid in the estimation of $U_i$ at later points in time In some embodiments, relevance module 54 may use the updated values of various parameters stored in knowledge base 8 (as updated by linkage strength update module 58 and item understanding update module 60) to recreate a candidate list of subject items and associated priority values that may then be used by user interaction module 56 for subsequent presentation to the user, so that the algorithm may iterate in a cyclic manner.

Further, exemplary architecture 52 may also include additional modules that may interact with knowledge base 8 and influence the operation of modules 54, 56, 58, and 60.

For example, in some embodiments, a testing module (not shown) may support evaluation modalities separate from user interaction module 56, for example, standard multiple choice exams or interactive games that evaluate user knowledge of subject items stored within knowledge base 8. In some embodiments, results obtained via the testing module may be used to set or update initial understanding values and linkage strengths; provide validation for understanding values in 8; or calibrate or reset parameters in knowledge base 8.

In some embodiments, a statistics and analytics module (not shown) may support the computation, visualization, and tracking of overall indicators of user performance, for example, the individual and aggregate rates at which one or more users learn new subject items. In some embodiments, the module could be used to perform detailed per-item analyses, for example plotting the collective or individual progress of users through the knowledge base over time, with distributions of understanding values computed for each subject item. In some embodiments, coarse estimations of user characteristics could be computed, by projecting the teaching parameter data into a reduced dimensional space; clustering of teaching parameters associated with multiple users could be performed, in order to classify users into discrete groupings; and correlations could be extracted to identify variables that influence user comprehension and interest. In some embodiments, correlations could be extracted in conjunction with A/B testing performed over a set of multiple users; for example, a variant form of a subject item could be presented to a subset of users, and the net effect on the average degree of user comprehension associated with that item could be evaluated. For example, A/B testing might indicate that subject items with brighter visual elements are more comprehensible to primary school students; this information could be used to further refine the content of the knowledge base.

In some embodiments, a social module (not shown) may support communications based on and influenced by the progress of users in learning items from knowledge base 8. For example, through the social module, users could add annotations or comments to the subject items as they learned them. They could also send forward-and-hold messages or real-time communications to each other or external teachers, e.g. in text, audio, or video format. The communications could be linked to particular subject items, or unrestricted.

Figure 5A:
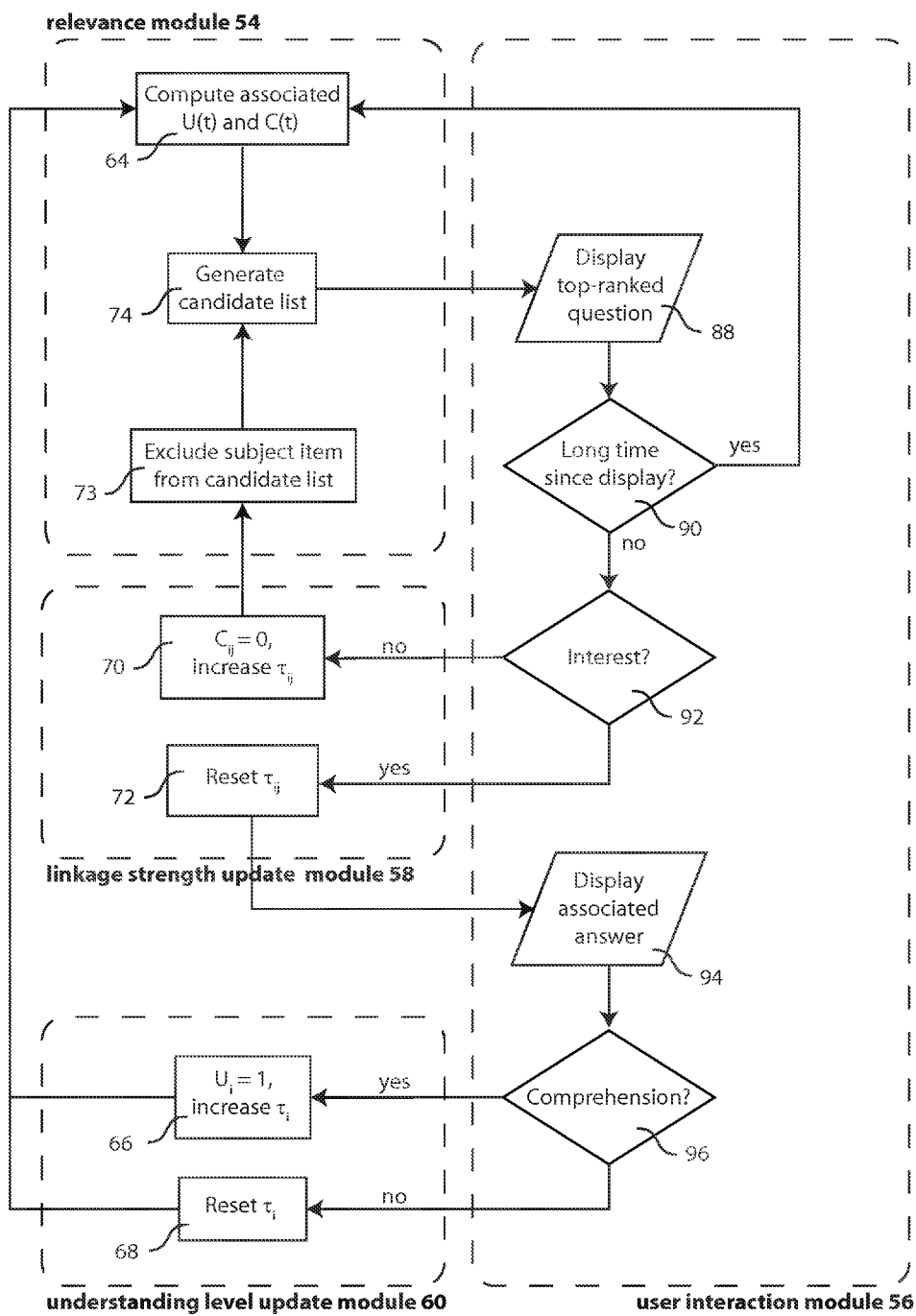
FIG. 5A shows a flowchart illustrating an exemplary method for updating linkage strengths and decay times; understanding levels and decay times; and priority values to determine and rank subject items for presentation to a user.

FIG. 5A shows a flowchart illustrating an exemplary method 62 for updating understanding values, linkage strengths, and priority values to determine subject items for presentation to a user. In some embodiments, method 62 may be implemented using computing device 4, or may be implemented through a web site, with inputs and outputs communicated over the Internet. FIG. 5A also shows, in the dashed rectangular areas, exemplary modules that may implement the steps within the rectangular areas. However, it should be noted that the steps associated with the modules are exemplary only and the modules implementing method 62 may be combined, broken up, and/or rearranged as would be apparent to one of ordinary skill in the art.

For ease of explanation in outlining the operation of exemplary method 62, it is assumed that one or more subject items have already been presented. Accordingly, a new candidate list containing candidate subject items to be presented may now be created by method 62, for example, by using exemplary relevance module 54 to perform appropriate steps. If method 62 is being run for the first time, the subject items to present first may be specified based upon preset values in knowledge base 8.

In some embodiments, exemplary relevance module 54 may create a new candidate list in three stages. In the first stage, which may be carried out by step 64, values of relevant teaching parameters, such as understanding levels and linkage strengths, at the current time may be computed. In the second stage, which may be carried out in step 74, candidacy may be determined, using criteria based on the newly computed teaching parameters; the candidacy-determining criteria may be applied to multiple subject items in order to populate the candidate list with candidate subject items. In the third stage, which may be carried out by step 74, priority values for the candidate subject items may be computed, based on the newly computed teaching parameters.

In step 64, understanding levels and linkage strengths associated with subject items being considered for inclusion on a candidate list may be computed, using equations 1 and 2:

$$U_i(t+\Delta t) = U_i(t)\exp(-\Delta t/\tau_i) \quad (1)$$

$$C_{ij}(t'+\Delta t') = 1-(1-C_{ij}(t'))\exp(-\Delta t'/\tau_{ij}) \quad (2)$$

where for a subject item i, $U_i$ represents an understanding level, and $\tau_i$ represents an understanding time decay parameter; and for a pair of subject items i and j, $C_{ij}$ represents a linkage strength, and $\tau_{ij}$ represents a linkage perturbation time decay parameter. Each item contains a time stamp t specifying when $U_i$ was last updated (which may correspond to the last time that a comprehension input was provided for subject item i); likewise, each link may include a field for a time stamp t' specifying when $C_{ij}$ was last updated (which may correspond to the last time that an interest input was provided for subject item i or j). When step 64 is being executed, the difference between the current time and the time stamp t is computed to produce variable $\Delta t$, which is then used in computing $U_i$; similarly the difference between the current time and the time stamp t' is computed to produce variable $\Delta t'$, which is then used in computing $C_{ij}$. While understanding levels and linkage strengths are formulated to vary exponentially as a function of time in accordance with a single characteristic time constant in method 62, in other embodiments, alternate models of how understanding levels and linkage strengths vary with time may be formulated, using functional forms containing one or more time variation modification parameters which may be varied in modules 58 and 60.

Next, in step 74, a candidate list ordered by priority values may be constructed, which determines the preferred order of presentation of subject items with linkages to subject item i. In some embodiments, subject items S with linkages to subject item i may be added to the candidate list if:

(i) for a subject item S, its understanding value $U_S$ is below a threshold value $U_{threshold}$;

(ii) the weighted average understanding level $\langle U_{basic} \rangle$ of subject items linked with a basic link to subject item S is above $U_{threshold}$, as shown below in equation (3);

$$\langle U_{basic} \rangle = \frac{\sum_{basic} C_{S-basic} U_{basic}}{\sum_{basic} C_{S-basic}} \quad (3)$$

(iii) the weighted average understanding level $\langle U_{advanced} \rangle$ of subject items linked with an advanced link to subject item S is below $U_{threshold}$, as shown below in equation (4);

$$\langle U_{advanced} \rangle = \frac{\sum_{advanced} C_{i-advanced} U_{advanced}}{\sum_{advanced} C_{i-advanced}}, \quad (4)$$

(iv) a time interval of at least $T_{refractory}$ has elapsed since the last time item S was presented.

The criteria above may result in the addition of subject items to the candidate list that focus student attention in the zone between known basic subject items and unknown advanced subject items, where learning is most profitable.

Figure 5B:
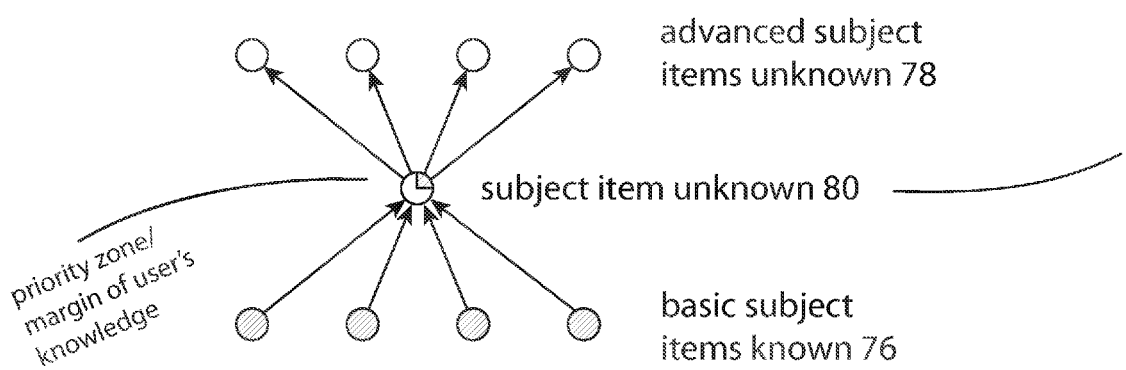
FIG. 5B shows a set of basic subject items and advanced subject items connected to an exemplary candidate subject item.

FIG. 5B shows a set of basic subject items 76 and advanced subject items 78 connected to an exemplary candidate item S 80. In general, there may several subject items considered for inclusion in a candidate list. In FIG. 5B, fully shaded circles indicate an understanding level of 1, and circles without any shading indicate an understanding level of 0. A partially shaded circle indicates some understanding of the subject item. As shown in FIG. 5B, in some embodiments, for inclusion in the candidate list, exemplary algorithm 62 may focus on those subject items S whose understanding is below some threshold value, but whose linked basic subject items are well-understood, and linked advanced subject items are poorly-understood. Thus, the candidate list when populated represents items in a zone on the margins of a user's knowledge.

Other variations in how the candidate list is constructed are possible and envisaged. For example, in some embodiments, thresholds for inclusion onto the candidate list can be made fuzzy, and the threshold values can be made to vary over time. In some embodiments, weighted averages may be computed using alternate functions, e.g. weights can be applied in a nonlinear fashion. In some embodiments, items not directly connected to the current item may also be considered for inclusion onto the candidate list.

Returning to FIG. 5A, following construction of the candidate list in step 74, in some embodiments, method 62 may determine one or more priority values for each subject item S that is selected for inclusion in the candidate list. One formula for computing a priority value $P_S$ is shown below in bias mapping function (5):

$$P_S = \frac{(1-(U_S/U_{threshold})^\gamma)^{1/\gamma} + J_S}{1+J_{max}} \quad (5)$$

In equation (5), $\gamma$ is a parameter which biases priority values. For example, $\gamma$ can be varied and take different values depending on whether a subject item S selected for inclusion in the candidate list are linked to subject item i with a basic, lateral, or advanced link. Thus, user efforts can be weighted to emphasize review, reinforcement, or advancement. In some embodiments, basic, lateral, and advanced items may be placed onto a single candidate list, and their overall priority values shifted relative to each other using $\gamma$ biases. In some embodiments, basic, lateral, and advanced items may be placed onto separate candidate lists, and the user may manually select at each stage which candidate list to view and peruse.

Figure 5C:
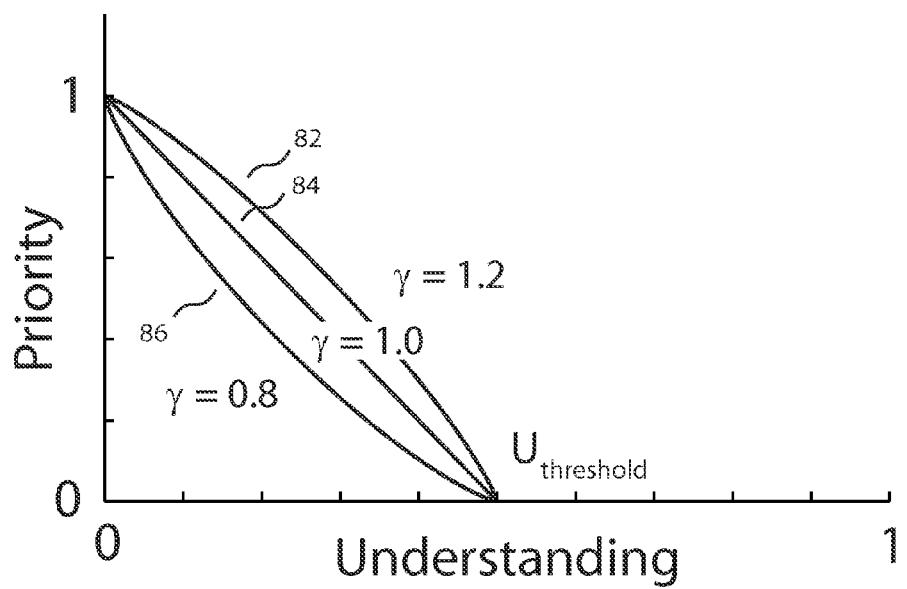
FIG. 5C shows an exemplary mapping illustrating the variation of priority values with understanding for different γ biases using equation (5).

FIG. 5C shows how equation (5) maps understanding values into priority values, for different biases or $\gamma$ values. As shown in FIG. 5C, higher $\gamma$ values bias the function toward higher priorities; on a plot of understanding level versus priority value, curve 82 ($\gamma=1.2$) lies above curve 84 ($\gamma=1.0$) which lies above curve 86 ($\gamma=0.8$).

In equation (5), the values $J_S$ for selected candidate subject items S are jitter parameters, which are pseudorandom floating point values uniformly distributed between 0 and a maximum jitter value denoted by $J_{max}$. In some embodiments, jitter values $J_S$ for all subject items S may be computed and fixed at the start of each user session, with one random value assigned to each subject item S. In some embodiments, the maximum jitter value $J_{max}$ may be chosen as a small value relative to the maximum priority value. For example, for priority values $P_S$, where $0 \leq P_S \leq 1$, the maximum jitter value may be set to approximately 0.01. The addition of random jitter to the priority values may have the effect of shuffling subject items $P_S$ with similar priority so that the order in which they appear varies between sessions.

Other variations in how the priority values are calculated are possible and envisaged. In some embodiments, the priority values of a given subject item may be made dependent on one or more of: current and/or previous understanding, priority, and/or linkage values. In some embodiments, iterative or direct procedures may be used to compute values that are self-consistent over the entire network. In some embodiments, bias mapping functions more complex than equation 5 may be used. In some embodiments, the bias mapping function may contain parameters that may differ between items and/or be directly modifiable by the user via a separate interface. In some embodiments, random jitter values may take on a more complex distribution and may be combined with priority values in a non-additive manner. In some embodiments, error uncertainty estimates may be computed, propagated, and incorporated into the priority values, and fuzzy ranking strategies may be used that take into account these uncertainty estimates.

Returning to FIG. 5A, after step 74, method 62 moves to step 88. In some embodiments, steps 88-96 may form part of exemplary user interaction module 56. In step 88, content associated with subject items on the candidate list may be displayed to the user. For example, content may be loaded from one or more knowledge bases 8, and one or more question portions of the content may be displayed to the user.

In some embodiments, each subject item on the candidate list may be associated with a priority value, and the question with the highest priority value may be displayed to the user. In some embodiments, several questions on the candidate list may be displayed simultaneously, ranked in decreasing order of priority value. In some embodiments, multiple priority values may be associated with each subject item to form a multidimensional vector $\{P^{(1)}, \ldots, P^{(N)}\}$, and user-specified factors may be used to select a vector component P, a weighted sum of vector components, or an arbitrary function of vector components, which permits the ranking and display of questions. In some embodiments, other factors may affect the ranking and display of questions; for example, questions which have not been previously presented to the user may be ranked lower than questions that have been presented at least once before thereby favoring the consolidation of existing user knowledge prior to the presentation/acquisition of new knowledge.

In some embodiments, at step 90, if user input is not received with some predetermined interval of time ("Yes," in step 90), algorithm 62 may reiterate through steps 64, 74, 88, and 90 to recalculate understanding, linkage, and priority values as time elapses. Accordingly, subject items presented to the user for selection may change with time even without user input, in response to expected and predicted changes in memories and associations between subject items as time elapses. In some embodiments, the recalculation process may use equations (1), (2), and (5) to compute more timely values of the above parameters.

If user input is received within the predetermined time interval ("No," in step 90), then, in step 92, the user may express positive or negative interest in the subject item presented. For example, the user may express interest in a candidate subject item by selecting it for further viewing and learning, or express disinterest in a subject item by skipping over it. In some embodiments, the user may be presented with subject item question content sequentially, in order of priority value ranking, for rejection or acceptance. For example, the user may express interest or disinterest by pressing buttons 16 or 18 on computing device 4.

In step 92, if the user expresses disinterest ("No," in step 92), then the algorithm proceeds to step 72, where linkage strength and associated time variation modification parameters, e.g. linkage perturbation decay parameters, may be updated. On the other hand, if the user expresses interest in the subject item presented ("Yes," in step 92), then, in step 72, the answer portion of the content associated with the subject item may be presented. In some embodiments, steps 70 and 72 may be implemented using exemplary linkage strength update module 58.

In one embodiment, user interest may be measured while allowing the student free-form exploration of the knowledge base. Instead of introducing questions sequentially, one or more questions from the candidate list may be displayed simultaneously. The user may then select a question from the list to answer. The user's selection may be taken to indicate positive interest in the subject item associated with the selected question; negative interest in the subject items associated with the not-selected questions; or both. In general, interest and comprehension inputs may vary discretely over a greater range of values, or may vary continuously. The exemplary binary ("Yes"/"No") inputs described are for explanatory purposes only and various other schemes for measuring user interest and comprehension are possible and envisaged as would be apparent to one of ordinary skill in the art. In some embodiments, user interest and/or comprehension may also be measured and input over a greater number of dimensions, forming for example the multidimensional vector $\{I^{(1)}, \ldots, I^{(N)}\}$ and/or $\{c^{(1)}, \ldots, c^{(N)}\}$. For example, user interest and/or comprehension may be obtained for different content portions associated with a subject item, or user interest and/or comprehension may be categorized and interest and understanding values may be obtained for the various individual categories.

In some embodiments, if there are no items of interest to the user on the candidate list, or if the candidate list is empty, a random subject item chosen from among candidate subject items j connected to current subject item i may be selected for presentation. When the user indicates disinterest in step 92, then, the algorithm may iterate through steps 73, 74, 88, and 90 until a non-empty candidate list with an item of interest to the user is available.

In step 70, linkage strength and linkage perturbation decay parameters are updated in response to interest input provided relevant to a subject item i, and the time stamp t associated with links between associated items is set to the time the update was performed. For instance, if the student is not interested ("No" in step 92), then in step 70, the linkage strength $C_{ij}$ between the subject item i and the immediately preceding presented subject item j may be set to zero or a sufficiently low value, and the linkage perturbation decay time $\tau_{ij}$ between subject items i and j may be increased. In some embodiments, $\tau_{ij}$ may be increased based on equation (6) below, $$\tau_{ij}(\text{new}) = \alpha \tau_{ij}(\text{old}), \alpha > 1 \qquad (6)$$

where $\alpha$ is a multiplicative factor that is related to the persistence of user interest after repeated exposure to a question. Higher values cause the algorithm to wait longer before attempting to reevaluate student interest.

Next, in step 73, the candidate subject item j, in which the user has indicated disinterest, may be removed from the candidate list and the algorithm may proceed to step 74 to generate/update the candidate list and begin another iteration through steps 74, 88, 90, 92, 70 and 73.

Conversely, if the student is interested in the item ("Yes" in step 92), then in step 72 the linkage perturbation decay time $\tau_{ij}$ between subject items i and j may be reset, based on equation (7) below, $$\tau_{ij}(\text{new}) = \tau_{ij}(\text{original}) \tag{7}$$

Thus, in step 92 if a student is not interested in a subject item i, the linkage strength $C_{ij}$ between subject item i and the immediately preceding subject item j idea may be diminished temporarily. The linkage strength may subsequently gradually increase over time, but repeated user disinterest causes the increase in linkage strength value to take longer and longer. Equations 6 and 7 correspond to negative selection update rules, where repeated disinterest weakens links between items.

In some embodiments, the update rules may be modified so that positive interest causes the linkage strength between subject item i and the immediately preceding subject item j idea to be increased temporarily. Under these rules, the interest level decreases back to one over time, but repeated interest causes this to take longer and longer to happen. These modified conditions correspond to positive selection update rules, where repeated interest strengthens links between items.

In some embodiments, the rules for modifying time variation modification parameters, such as understanding and/or linkage perturbation decay times, may be formulated in a manner analogous to some "spaced repetition models", which are memorization systems based on the empirical observation that to optimally fix an item in memory, the item should be displayed and recalled at intervals of ever-increasing duration. An example of the spaced repetition model is the Pimsleur Language Learning System, in which items are introduced at intervals of 5 seconds, 25 seconds, 2 minutes, 10 minutes, etc. on to a maximum interval of 2 years. The spaced repetition model assumes that increased viewing and recall of an item at appropriate intervals is associated with a slower rate of decay in the subsequent memory trace.

Concepts pertaining to the spaced repetition model may be understood from the following example. For example, in a conventional flashcard based scheme to promote recollection termed "Leitner's method", flashcards may be imprinted with questions on one side and answers to questions on the other. All of the flashcards are initially placed together in the lowest group, which may be called "Group 0". Cards may be moved to higher groups (which may be called "Group 1", "Group 2" etc., for example) if they are recalled correctly by the user, or demoted to lower groups if they are not recalled correctly. The frequency of review is highest for cards in the lowest group and the lowest for cards in the highest group. Flashcards that were not recalled correctly by the user may be demoted to a lower group (until they reach Group 0), where they are reviewed with increasing frequency. In this way, the user's attention is focused on the cards that are the most troublesome to retain in memory. In general, however, conventional schemes implementing spaced repetition models are focused on memory retention and fail to account for associations and dependencies between subject items in a knowledge base.

In some embodiments, following the reset of linkage perturbation decay time $\tau_{ij}$, in step 92, the algorithm proceeds to step 94. In step 94, content associated with the answer field for subject item i in knowledge base 8 may be displayed to the user.

In step 96, the algorithm determines the user's comprehension of the content associated with the answer field of subject item i. In some embodiments, this determination is made by having the student directly input the extent to which content associated with the answer field was comprehended, in some embodiments by pressing buttons 16 or 18 on computing device 4. In some embodiments, this determination may be made via a more extended programmatic comparison between one or more user inputs and a pre-stored template, e.g. multiple-choice questions, or via a more complex programmatic evaluation, e.g. handwriting recognition, speech processing, etc.

Following determination of user comprehension in user interaction module 56, for instance by step 96, the understanding level $U_i$ and understanding decay time parameter $\tau_i$ are updated in response to the comprehension input provided for subject item i, and the time stamp t associated with subject item i may then be set to the time the update was performed.

If the algorithm determines that the user has comprehended the content associated with subject item i ("Yes" in step 96), then, in step 66, the understanding level of the user $U_i$ for subject item i may be increased or set to 1, and the decay time $\tau_i$ associated with subject item i may be increased so that a longer period will elapse before subject item i is presented again to the user. In some embodiments, the decay time $\tau_i$ associated with subject item i may be increased based on equation (8) below, $$\tau_i(\text{new}) = \beta \tau_i(\text{old}), \beta > 1 \tag{8}$$

where $\beta$ is a multiplicative factor related to the persistence of student understanding after repeated exposure to an answer. Higher $\beta$ values cause the algorithm to wait longer before attempting to reinforce student understanding. In some embodiments, $\beta$ may be a multiplicative factor for a spaced repetition model.

In the event that content related to subject item i has not been comprehended ("No" in step 96), the algorithm proceeds to step 68, and the decay time $\tau_i$ associated with subject item i may be decreased so that the time period before subject item i is presented again to the user is shortened. In some embodiments, the decay time $\tau_i$ associated with subject item i may be decreased based on equation (9) below, $$\tau_i(\text{new}) = \tau_i(\text{original}) \tag{9}$$

In some embodiments, steps 66 and 68 may form part of exemplary subject item understanding update module 60. After steps 66 or 68 are complete, algorithm 62 may return to step 64 to begin another iteration.

Figure 5D:
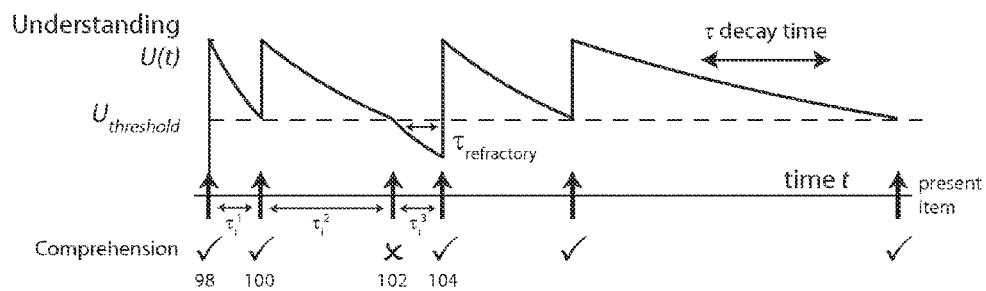
FIG. 5D illustrates graphically the exemplary variation of understanding level $U_i(t)$ associated with subject item i over time t.

FIG. 5D is an exemplary illustration showing how understanding level $U_i(t)$ associated with subject item i varies over time t. In the example shown in FIG. 5D, the item is presented to the user repeatedly. In the first two exposures 98 and 100, the student indicates positive comprehension (shown by "✓" in FIG. 5D) of the answer causing the understanding value $U_i$ to be set to 1. As shown in FIG. 5D, the decay time $\tau_i^2$ after the second exposure 100 is greater than the decay time $\tau_i^1$ after the first exposure 98 because the decay time $\tau_i$ associated with subject item i is increased when the user indicates positive comprehension.

In the third exposure 102, the user indicates negative comprehension, (shown by "X" in FIG. 5D) of the answer causing the understanding value $U_i$ to drop below $U_{threshold}$. Consequently, decay time $\tau_i^3$ is shortened and lower than $\tau_i^2$. Accordingly, subject item i may be presented more frequently if at least the time interval $T_{refractory}$ has elapsed since the last time subject item i was presented. Even after the student indicates positive comprehension subsequently 104, decay time $\tau_i$ remains lower than $\tau_i^2$, and subject item i may be presented more frequently to reinforce understanding. In some embodiments, a candidate subject item becomes eligible for presentation when its understanding level falls below $U_{threshold}$. If the user repeatedly indicates comprehension then the item may be presented less and less frequently, consistent with spaced repetition principles.

Figure 5E:
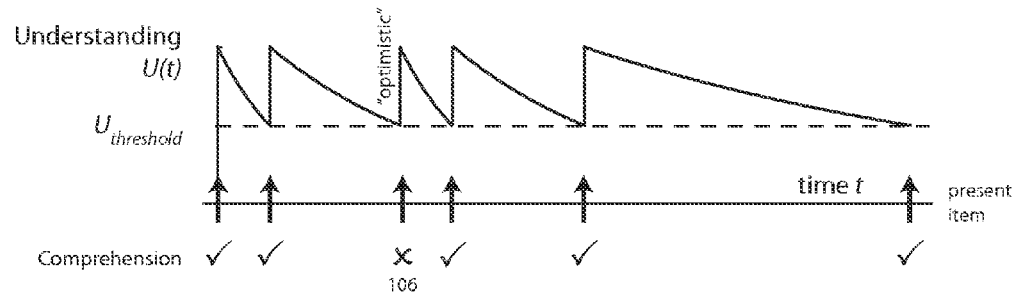
FIG. 5E illustrates graphically an exemplary situation where the understanding value $U_i$ may be set to 1 despite negative user comprehension, which may permit a "sneak peek" at advanced topics.

In some embodiments, the retention model may assume that mere exposure to an item even without comprehension creates a transient period of heightened understanding. During this brief period, more advanced items that contain the current item as a prerequisite may be presented, allowing user a "sneak peek" at advanced topics based on an optimistic assessment of the student's current knowledge. FIG. 5E shows an example where the understanding value $U_i$ may be set to 1 even when the user indicates negative comprehension 106, which may permit a "sneak peek" at advanced topics.

In algorithm 62, understanding levels and linkage strengths are modeled as variables which vary over time in a manner described by an exponential function with a characteristic time variation modification parameter, which is varied by a multiplicative factor or reset when user inputs of interest and comprehension are provided. In some embodiments, more complex rules can be used to update one or more parameters associated with the same or alternate models of how understanding levels and linkage strengths vary with time. For example, in some embodiments, a preset array of values could contain data on how memory decays, as a function of elapsed time, and sequential re-exposure to information. Such a predefined array could be used to compute changes to time variation modification parameters in response to user inputs. In some embodiments, the time variation modification parameter adjustment function may be nonlocal in time, so that it depends on some or all of the history of previous user inputs. In some embodiments, the time variation modification parameter adjustment function may be nonlocal in scope, so that it is affected by parameters associated with other subject items in addition to the currently selected subject item.

In some embodiments, understanding levels and linkage strengths may be updated using a model based, at least in part, on the time elapsed since the last update, and zero or more time variation modification parameters such as linkage perturbation decay time $\tau_{ij}$ and decay time $\Sigma_i$. As described above, $\tau_{ij}$ is varied in equations (6) and (7) above, and $\tau_i$ is varied, as described below, in equations (8) and (9). In some embodiments, the time variation modification parameters may be based on spacing intervals from a spaced repetition model, which may arise from models similar to Leitner's method or through the use of neural network based models. In some embodiments, no time variation modification parameters are included, and understanding levels and linkage strengths vary with time in a way unmodified by external parameters.

In algorithm 62, interest inputs only influence teaching parameters insofar as they directly vary linkage strengths and associated time variation modification parameters. Alternate methods by which interest inputs can influence teaching parameters are possible and envisaged. For example, in some embodiments, interest levels may be input, stored, and allowed to decay on a per-item basis instead of a per-link basis, using a spaced-repetition model. In some embodiments, links between two items with high per-item interest levels may then be specially strengthened. In some embodiments, per-item interest levels may also be used to directly alter priority levels, e.g. by modifying γ bias values.

In algorithm 62, user-specific parameters, which are associated with a particular user and stored in knowledge base 8 are termed a "user profile", and may encompass subject item understanding levels, linkage strengths, time variation modification parameters and other parameters. As individual users interact with exemplary system 2, and algorithm 62 operates, user profiles may evolve to reflect the users' individual abilities, interests, and knowledge more closely. It is expected that a judicious selection of initial parameters may permit quicker convergence to a user's learning state.

In some embodiments, user profiles may have initial values set by user inputs, by the results of a testing procedure, or by statistical or normal values for an expected class of users. For example, if the users are students, understanding values and linkage strengths may be based on the material that the student may be expected to know based on the student's grade level. For example, a middle school student might be expected to know arithmetic and algebra, but not advanced geometry or calculus. Thus, understanding level values of appropriate algebra and arithmetic related subject items could be initially set to some high value (e.g. 1) and understanding values for advanced subject items such as calculus could be initially set to a low value (e.g. 0). In some embodiments, the initial user profiles associated with a group or class may be set by averaging previously determined user profiles over an ensemble of students of similar education, using classifications that can vary from the coarse—e.g. grade level—to the fine-grained—e.g. groupings obtained algorithmically using a k-means clustering scheme.

In some embodiments, data stored or input on computing device 4 may be synchronized or uploaded to server farm 12 and/or cloud 10 to permit individual user profiles to influence and be influenced by other user profiles. For example, in some embodiments, subject items that have not yet been presented to the user may have some teaching parameters set from values derived from the prior and/or current aggregate experience of other students. In some embodiments, once a user starts learning specific subject items, algorithm 62 will update the user's profile with values that more closely track the user's own interests, abilities, and knowledge as they begin to diverge from preset norms and/or statistically derived profiles and values.

Figure 6:
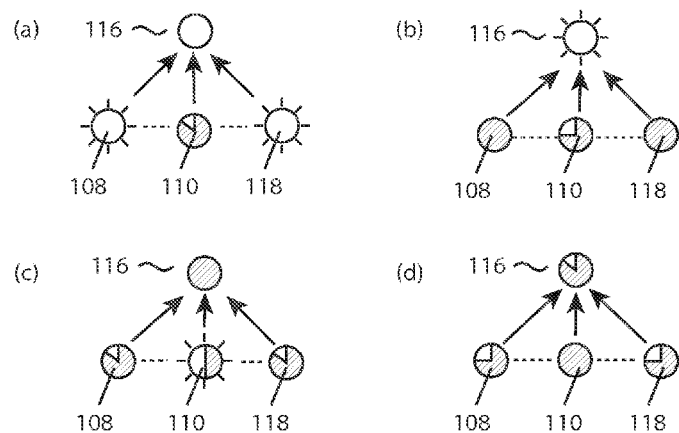
FIGS. 6(a)-(d) illustrate an exemplary progression from presenting basic subject items to presenting more advanced subject items in a manner consistent with disclosed embodiments.
Figure 7:
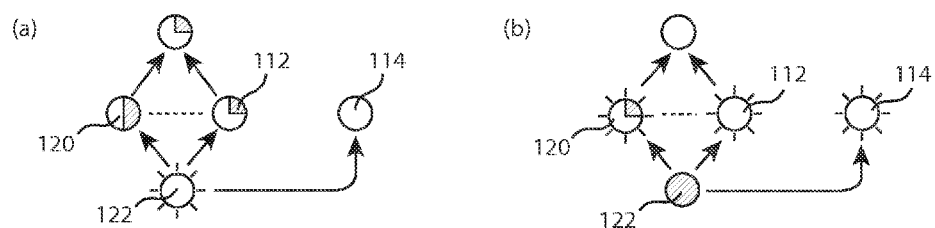
FIGS. 7(a)-(b) shows a scenario where basic subject items are presented for review in a manner consistent with disclosed embodiments.
Figure 8:
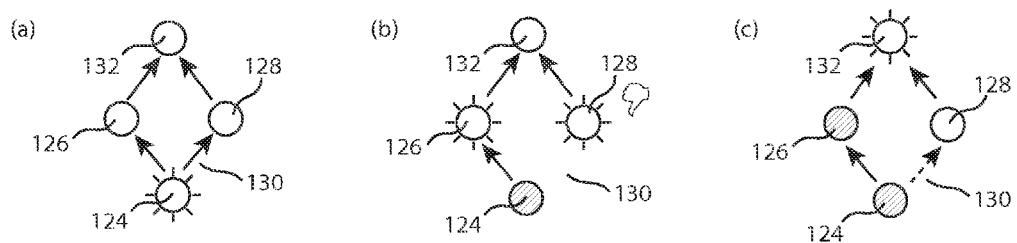
FIGS. 8(a)-(c) illustrates how input of user interest can influence the presentation of subject items and paths to the presentation of more advanced subject items in a manner consistent with disclosed embodiments.

FIGS. 6-8 show examples illustrating the dynamics of user learning in a sequence of scenarios in an exemplary system for facilitating knowledge dissemination and promoting knowledge acquisition. In FIGS. 6-8 subject items are shown by circles and user-specific understanding values U corresponding to individual subject items (for a given user) are indicated by pie shading within each subject item (shown as a circle), where:

(a) No shading implies that U=0, e.g. item 108 in FIG. 6(*a*);

(b) Full shading implies that U=1, e.g. item 108 in FIG. 6(*b*); and (c) Partial shading implies that 0<U<1 e.g. item 110 in FIG. 6(*a*).

Further, linkage strengths between subject items are indicated by the pattern of the lines connecting subject items, so that for a pair of subject items i and j:

(a) No line implies $C_{ij}$=0, e.g. FIG. 7(*a*) between items 112 & 114;

(b) Dotted line with arrow implies $C_{ij}$=0.5, e.g. FIG. 6(*c*) between items 110 & 116;

(c) Solid line with arrow implies $C_{ij}$=1, e.g. FIG. 6(*a*) between items 108 and 116; and (d) Dotted lines without arrows indicate lateral connections with $C_{ij}$=1, e.g. FIG. 6(*a*) between items 108 and 110.

In addition, in FIGS. 6-8, subject items with high priority values are indicated with a sunburst, e.g., item 110 in FIG. 6(*a*).

FIG. 6 illustrates an exemplary progression from presenting basic subject items to presenting more advanced subject items in a manner consistent with disclosed embodiments. In FIG. 6(a), subject item 110 has already been presented and is understood by the student, so in a subsequent iteration, related subject items 108 and 118, which are linked laterally to subject item 110, may be presented. With subject items 108 and 118 understood (as shown in FIG. 6(b)), subject item 116 may be eligible for addition to the candidate list, since the understanding level of subject item 116 is low, and the average understanding level of basic subject items 108, 110, and 118 is now high. Thus in the next step, as shown in FIG. 6(b), item 116 is assigned a high priority value (sunburst) and presented.

FIG. 6 also illustrates the decay of user understanding levels of subject items with time. As shown in FIG. 6(c), subject item 116, which was just presented, is shown as fully understood, but subject items 108, 118, and particularly 110 show decay in understanding levels. In some embodiments, when a subject item is first introduced, a short understanding decay time is assigned to the item, indicative of the likelihood of a quicker decay of a user's understanding level. Later, after the subject item has been presented multiple times, and the user continues to indicate a high degree of comprehension, the decay time may be raised, resulting in less frequent presentation of the item.

In FIG. 6(c), the predicted understanding of subject item 110 may have diminished far enough that it becomes eligible to be presented again. After the presentation of subject item 116, the priority value associated with subject item 110 is higher than that of any other subject item linked to subject item 116; therefore, subject item 110 may be presented to the student again. FIG. 6(d) shows the final result where items 108, 110, 118, and 116 are now well-understood.

FIG. 7 shows a scenario where basic subject items are reviewed in a manner consistent with disclosed embodiments. In FIG. 7a, predicted understanding levels of subject items 120 and 112 have decayed far enough that item 122 may be added to the candidate list and presented. The inclusion of subject item 122 may be triggered by a decrease in the predicted understanding levels of more advanced items 120 and 112.

In FIG. 7(b), the understanding of subject item 122 may qualify subject items 120, 112, and 114 for inclusion on the candidate list. Note that subject item 114, which may not have been previously presented, is now eligible for presentation. The scenario shown in FIG. 7(b) is illustrative of an instance when a review of basic subject items may open up new subject items for learning. For example, a user who questioned the need for the zero element and commutator relations and expressed appropriate interest may be introduced to the ideas of group theory.

FIG. 8 illustrates how inputs of user interest can influence the presentation of subject items and paths to the presentation of more advanced subject items in a manner consistent with disclosed embodiments. In FIG. 8(a), subject item 124 may be presented and, as shown in FIG. 8(b) is comprehended by the user. At this point, advanced subject items 126 and 128 may become eligible for inclusion in the candidate list for presentation. If subject item 128 is of higher priority and presented first, but the user does not express interest in subject item 128, then, the next highest priority subject item linked to subject item 124, which may be subject item 126, may be presented. As shown in FIG. 8(b), subject item 128 has been rejected by the user, and subject item 126 is selected for presentation with the user expressing interest. In some embodiments, the link strength of link 130 may be set to 0 when the user expresses disinterest in subject item 128. Once subject item 126 has been understood by the user, advanced subject item 132 linked to subject item 126 may be eligible for inclusion in the candidate list and for possible presentation to the user. As FIG. 8 shows, subject item 132 could also have been selected as a candidate for presentation if the user had expressed an interest in subject item 128. Thus, user interest helped determine the learning path to subject item 132. The path to subject item 132 was given by subject items 124-126-132 and selected based on user interest (instead of the alternate learning path given by subject items 124-128-132). In some embodiments, the learning path may be dynamically modified by the user or automatically by the system to add or remove subject items of interest.

As shown in FIG. 8(c), the linkage strength of link 130 may be restored over time, but if the student repeatedly expresses disinterest when subject item 132 is presented after the viewing of subject item 124, then the time period over which link 130 may be restored will keep increasing with each additional rejection. FIG. 8 illustrates the situation where a rejected subject item may be selected for presentation again, in anticipation that user interest may shift with time, while respecting strongly held and repeatedly expressed disinterests.

Figure 9A:
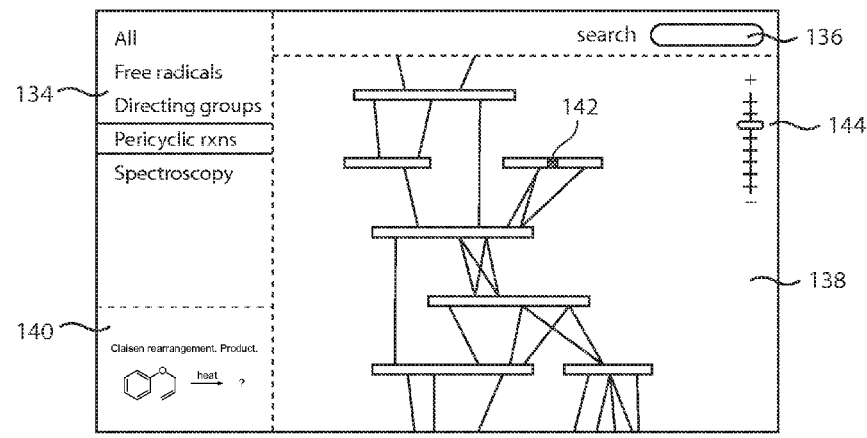
FIGS. 9A-9C show an exemplary interface on a computing device that facilitates changing and/or visualizing teaching parameters, subject item content, and subject item linkages.

FIG. 9A shows the teaching algorithm implemented on an exemplary computing device with an interface that facilitates more specific and direct changes to subject item content, teaching parameters contained in user profiles, and other elements contained in knowledge base 8. As shown in FIG. 9A, in some embodiments, a user may be able to browse the subject item content, view linkages between subject items, search for a subject item, and view the progress made thus far. In some embodiments, panel 134 and search bar 136 may be used to limit subject items displayed in pane 138. In some embodiments, laterally connected items may be arranged into horizontal bars, and advanced/basic connections may be displayed as single lines. The current subject item is displayed in pane 140 and may be highlighted in the structure graph, as shown in highlighted section 142. Finally, the entire display can be panned by dragging on 138 or zoomed in and out by dragging on 144. In some embodiments, finger movements on a multi-touch screen (such as a capacitive touch screen) on computing device 4 may be used to perform panning, zooming, selection, and other interactive functions. By selecting subject items manually through the browser, the student can start and reset the teaching algorithm from familiar points, accelerating the learning process. In some embodiments, multiple items may be made active at the same time, so that the user can study several unrelated subjects concurrently; in such an embodiment, the user can switch between the multiple items manually, or the algorithm can select the subject item whose next item is most presentable.

Figure 9B:
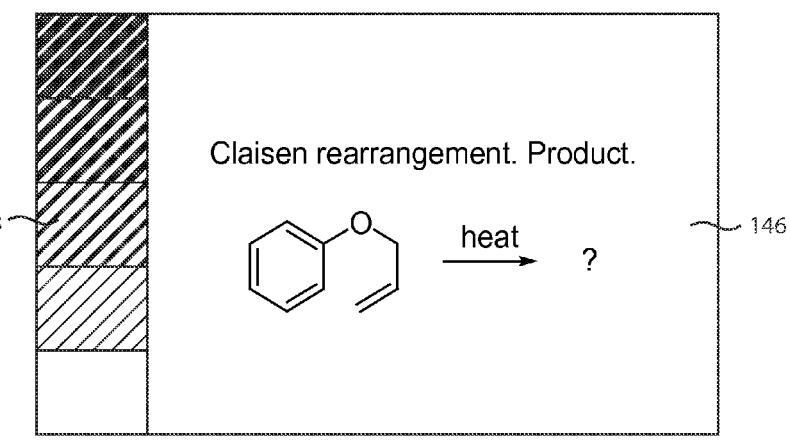

Further, as shown in FIG. 9B, in some embodiments, content associated with a subject item may be displayed in pane 146, and a user may be able to input the degree of comprehension using the grayscale shaded touchbar element 148.

Figure 9C:
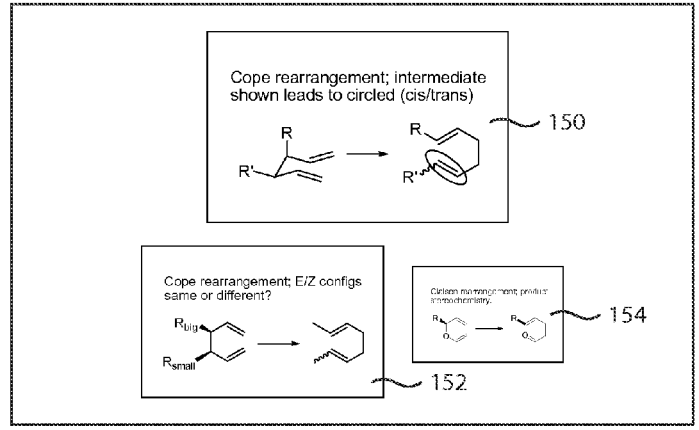

In other embodiments, as shown in FIG. 9C, the top three presentable subject items 150, 152, 154 may be displayed, with higher priority questions scaled to a larger size. By clicking and/or touching one of the displayed subject items, e.g., 152, the user may be able to indicate interest in the selected subject item 152 and disinterest in the other subject items.

Figure 9D:
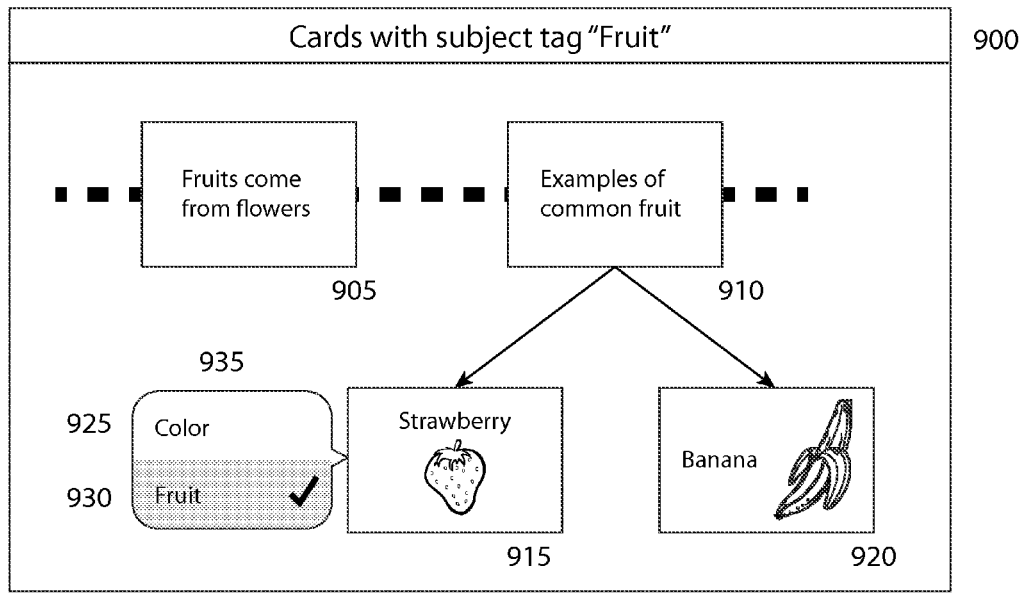
FIGS. 9D and 9E shown one or more subject items associated with one or more subject tags
Figure 9E:
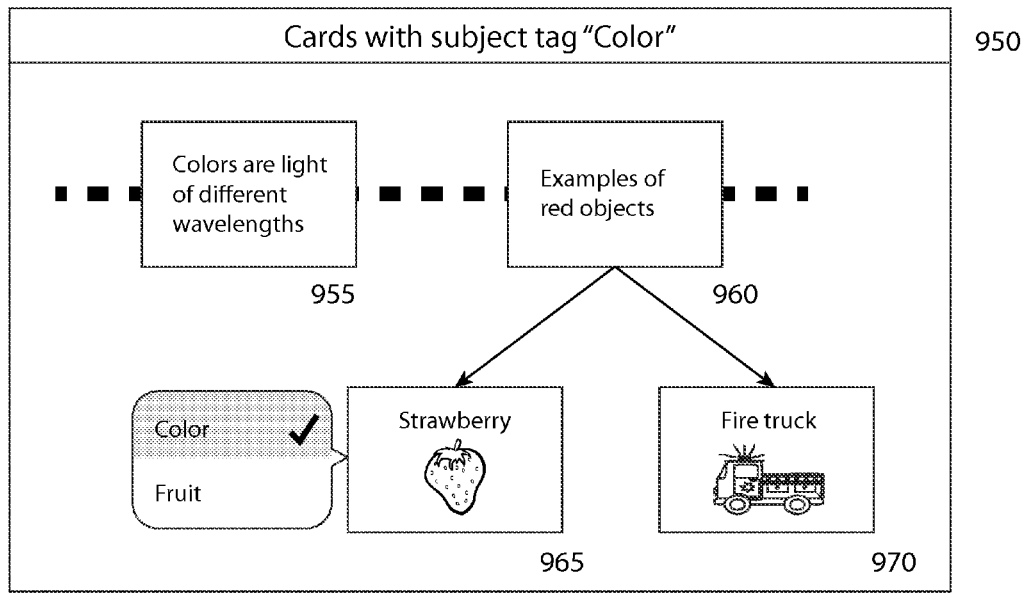

In other embodiments, as shown in FIGS. 9D and 9E, one or more subject items may be associated with one or more subject tags. For example, in FIG. 9D, subject items 905, 910, 915, and 920 are associated with the subject tag "Fruit"; and in FIG. 9E, items 955, 960, 965, and 970 are associated with the subject tag "Color." In some embodiments, subject items associated with one or more specified subject tags may be displayed together on one or more windows, pages, displays, screens, subviews, and/or devices. For example, GUI 900 is a display of subject items with subject tag "Fruit", while GUI 950 is a display of subject items with subject tag "Color."

In some embodiments, if a subject item is associated with one or more subject tags, pop-up window or other GUI element 935 may display subject tags associated with that subject item, and enable the user to select and/or view items associated with the selected subject tag on one or more windows, pages, displays, screens, subviews, and/or devices in GUI 900. For example, the subject item 915 ("Strawberry") is associated with two subject tags: tag 930 ("Fruit") and tag 925 ("Color"). In one implementation, tapping on subject item 915 causes interface element 935 to appear, which displays a list of associated subject tags. Selecting subject tag 930 ("Fruit") causes 900 (all cards with subject tag "Fruit") to be visible as a separate page, while selecting subject tag 925 ("Color") causes 950 (all cards with subject tag "Color") to be visible as a separate page.

In one implementation (not shown in FIGS. 9D and 9E), GUI elements may be used to display statistics pertaining to subject tags associated with subject items. For example, the number of subject tags associated with a subject item may be displayed alongside each item, and tapping on the number may cause GUI element 935 to become visible. In some embodiments, the subject tags displayed and/or their ordering may be based on metrics derived from the subject tags, such as the number of items associated with the tags, their popularity, and/or a dominant characteristic (such as whether subject items associated with a subject tag include multi-media material), and/or various other quantitative or qualitative metrics.

In some embodiments, computing device 4 may display output from a statistics and analytics module that assesses a student's understanding of a particular item, a group of items, or an entire knowledge base. In one embodiment, a binary indicator may be used where indicator(s) on exemplary computing device 4 may glow red if user understanding of a subject item is low, and more study is needed, and/or the indicator(s) may glow green otherwise. In some embodiments, a more detailed interface could visualize variations in teaching parameters associated with individual subject items using color coding, for example using the exemplary browser shown in FIG. 9A.

Figure 10:
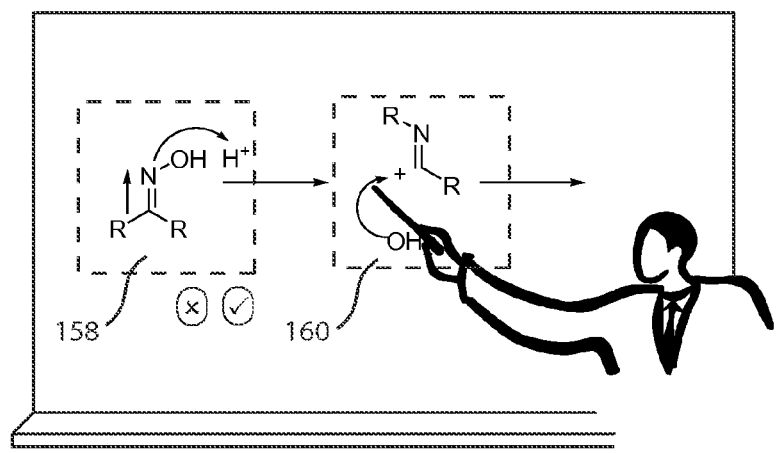
FIG. 10 shows an exemplary embodiment of a system for knowledge dissemination and acquisition implemented into an augmented reality device in a manner consistent with disclosed embodiments.

FIG. 10 shows an exemplary embodiment of a system 156 for knowledge dissemination and acquisition implemented into an augmented reality device in a manner consistent with disclosed embodiments. For example, system 156 may comprise a wearable computer, a heads-up display, a projector that directly beams a display into an operator's eye, an augmented reality system using a camera that tracks and recognizes objects around the operator. Such machines are used, for instance, by mechanics to assemble cabling in aircraft—step by step directions are projected directly onto the assembly space, making it clear where the cables should go. In an analogous way, a wearable form of the present invention could recognize lecture material being presented, and the student could indicate his interest and comprehension of such material through an interface that appears to float directly on top of the blackboard. For example, the buttons below pane 158 may be used to indicate interest and a pane such as pane 160 may be used to indicate comprehension. In some embodiments, knowledge base 8 may be continually or periodically updated during a conventional class lecture, and the teacher could receive immediate feedback on how well the lecture is being followed by the students. In some embodiments, system 156 may include devices that may be capable of receiving stimuli from the outside world while also effecting changes in the environment. For example, operation of the invention could influence the operation of a robot, vehicle, interactive model, or some laboratory equipment.

Figure 11:
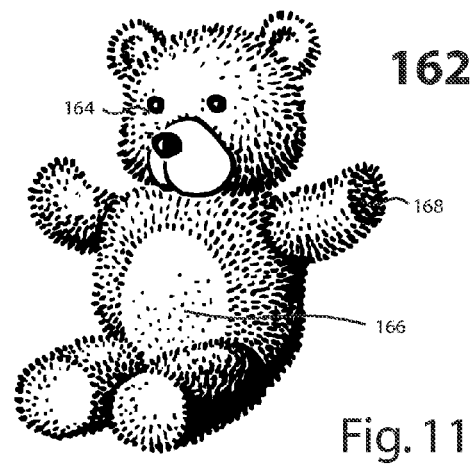
FIG. 11 shows a toy in the form of a teddy bear comprising an embedded teaching device that may be used to teach children languages.

FIG. 11 shows a teddy bear with an embedded teaching device 162 that may be used to teach children languages. In some embodiments, a system for knowledge dissemination and acquisition may be dressed in forms without displays or buttons, where the interface is indirect and hidden from plain view. The teddy bear with the embedded teaching device 162 may sense a child's presence through cameras and/or other sensors in its eyes 164; and may play audio via a speaker in its stomach 166; and may receive comprehension and interest inputs via pressure sensors on its arms 168 and stomach 166.

Figure 12:
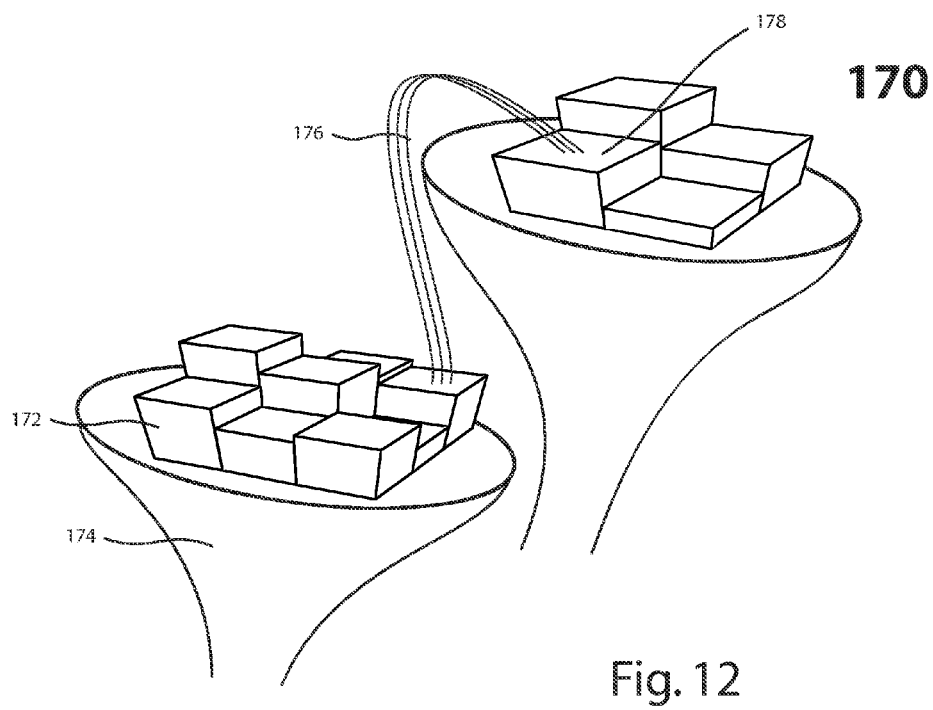
FIG. 12 shows an exemplary computer game, which uses raised blocks on mushroom-like stands to represent subject items.

FIG. 12 shows a computer game 170 where raised blocks 172 on mushroom-like stands 174 are used to represent ideas. In some embodiments, a system for knowledge dissemination and acquisition may be dressed in an entertaining format, where secondary environmental cues and effectors are used to maintain student interest. In computer game 170, users may learn by jumping from block to block and being presented with subject items. When they comprehend a subject item, the block may grow, and bridges 176 may sprout to new subject items 178 on other mushrooms. If they fail to comprehend an idea repeatedly, the block may be made to disappear and turn into a hole, and the student's character may slide down onto a lower level area. In general, a computer game, such as exemplary computer game 170 can reflect subject item linkages by using environmental cues; display priority values using metaphors such as hill steepness, obstacles, monsters, etc.; and gauge comprehension and interest based on player actions, such as which path the player walks down.

In some embodiments, computer game 170 may gauge the user's attention level and maintain an optimal attention level—not too sleepy or too frenetic. In some embodiments, the user's attention and/or degree of comprehension may be gauged by assessing the speed at which questions are answered; in response, teaching parameters might be varied, and in addition, steps might be taken to maintain the user's attention, e.g. by varying the pace of the game, modifying the background sounds or music, and/or including more or fewer interactive components. Subtle cues, e.g. changes in respiration, physiological parameters, or brain activity, could modify the operation of a system for knowledge dissemination and acquisition so that the system could be optimally responsive to the user thereby facilitating user engagement for long periods.

Figure 13A:
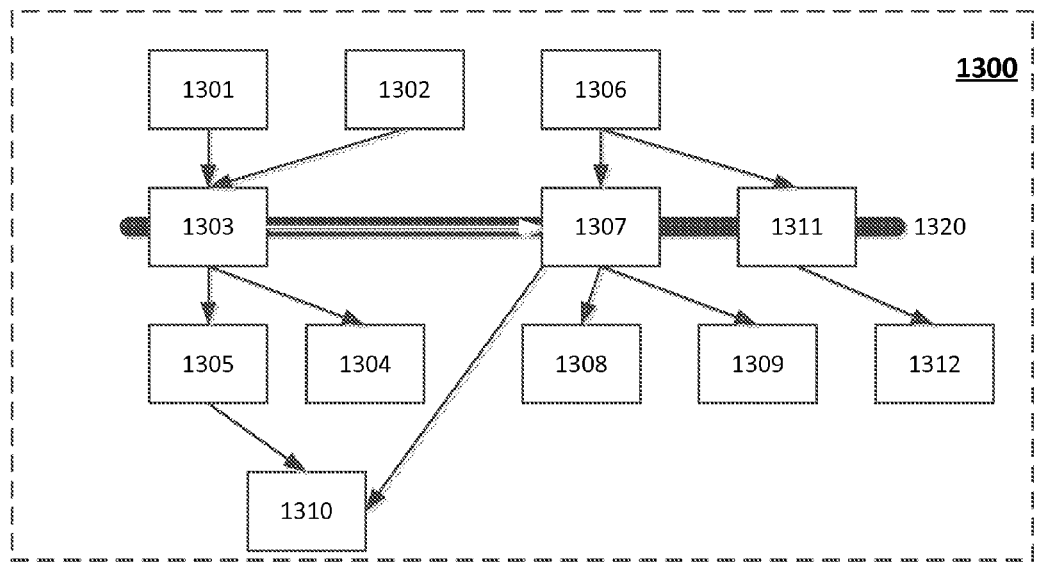
FIGS. 13A-13B show an exemplary graphical user-interface (GUI) 1300 for visualization and interaction with a knowledge base.
Figure 13B:
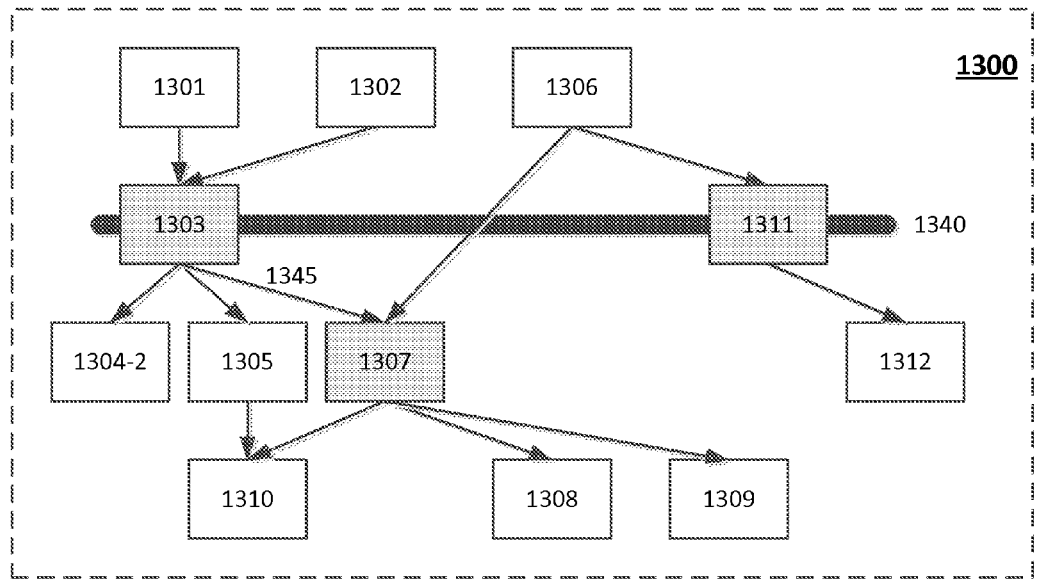

FIGS. 13A-13B show an exemplary graphical user-interface (GUI) 1300 for visualization and interaction with a knowledge base, with special emphasis placed on visualizing and modifying learning paths. In some embodiments, the learning path may be dynamically modified by the user or automatically by the system to add or remove subject items of interest. When a learning path is modified, the display may be updated in real time to reflect changes associated with the modifications.

In some embodiments, GUI 1300 may be displayed on computing device 4. As shown in FIG. 13A, one or more subject items in the knowledge base may be displayed as a knowledge graph. Subject items 1301 through 1312 form nodes of the knowledge graph. The terms "node" and "subject item" are used interchangeably herein.

Further, in GUI 1300, directed edges connect nodes. Edges directed (outward bound) from a first node to a second node indicate that the subject item represented by the first node is a basic subject item for the subject item represented by the second node. Conversely, edges (inward bound) into a first node from a second node indicate that the subject item represented by the first node is an advanced subject item for the subject item represented by the second node. The directionality of the edge may be represented explicitly, using an arrow or other indicator; or implicitly, by having the nodes arranged so that if A→B, A is always in a certain relative orientation to B (e.g. if A is more basic than B, then A is positioned above B).

A learning path is an ordered sequence of subject items. In some embodiments, subject items may be tagged with unique identifiers (UIDs), and a learning path may be represented in computer memory as an ordered sequence of UIDs.

In some embodiments, a default learning path may be defined and/or automatically generated for one or more subject areas. For example, a user may indicate a subject item as a goal, and a learning path may be generated from a starting subject item based on the user's profile and/or selections by the user. In some embodiments, one or more learning paths may be created and/or stored by a user and stored as a user attribute associated with a user profile.

In some embodiments, GUI 1300 may display subject items on learning paths more prominently so that users may more easily view and/or interact with learning path subject items. Further, GUI 1300 may also facilitate viewing and/or interaction with items which may be directly or indirectly linked to items on one or more learning paths. In some embodiments, GUI 1300 may selectively facilitate modification of subject items included in one or more learning paths.

A first subject item is termed directly linked to a second subject item, if the subject item is connected by a single edge or link to the second subject item. If the first subject item is considered prerequisite knowledge to the second subject item, then the first subject item is a basic subject item relative to the second. On the other hand, if the second subject item is considered prerequisite knowledge to the first subject item, the first subject item is an advanced subject item relative to the second.

Subject items may also be characterized relative to their proximity to a subject item on the learning path. The proximity of a first subject item relative to a second subject item on the learning path is the number of links traversed in the shortest path from the first subject item to the second subject item on the learning path. In some embodiments, edges may be removed to break cycles prior to determination of the shortest path in a directed graph. In some embodiments, the knowledge graph may be periodically checked for the existence of cycles, which may then be removed. In some embodiments, if the addition of a subject item and/or edge may create a cycle, options may be presented to remove one or more other edges to prevent cycles in the knowledge graph. Thus, in the basic direction relative to some node on the learning path, if subject item A is more basic than subject item B (e.g. there are one or more directed edges from A to B), then subject item B is more proximate to the subject item on the learning path. On the other hand, in the advanced direction, if subject item D is more advanced relative to subject item C (e.g. there are one or more directed edges from C to D), then subject item C is more proximate to the subject item on the learning path.

Nodes may be proximate to more than one learning path node, but may be preferentially associated with a particular learning path node, for example the one with the greatest proximity, or the one that appears earlier in the path, or some combination of such factors based on configuration parameters and/or user preferences.

In some embodiments, GUI 1300 may be displayed on computing device 4. As shown in FIGS. 13A and 13B, one or more subject items in the knowledge base may be displayed as a knowledge graph. Subject items 1301 through 1312 form nodes of the knowledge graph.

GUI 1300 shows subject items 1303, 1307 and 1311 on learning path 1320. As shown in FIG. 13A, learning path 1320 is indicated by heavy line 1320 and may be defined by the UIDs associated with nodes 1303, 1307 and 1311, respectively.

As shown in FIG. 13A, in GUI 1300, node 1303 is connected to basic subject items 1301 and 1302, while nodes 1307 and 1311 have node 1306 as a basic subject item. Further nodes 1304 and 1305 are advanced subject items for node 1303, while node 1312 is an advanced subject item for node 1311. Nodes 1308, 1309, and 1310 are advanced subject items for node 1307. Node 1310 is also an advanced subject item for node 1305.

Thus, the knowledge graph shown in FIG. 13A may be viewed as comprising of: (i) a subgraph of nodes 1303, 1307 and 1311 on learning path 1320; (ii) a basic subject item subgraph comprising nodes 1301, 1302 and 1306 above the learning path and (iii) an advanced subject item comprising nodes 1304, 1305, 1308, 1309, 1312 and 1310 below the learning path. In one implementation, a depth-first traversal method starting from a selected node or a subject item on the learning path may be used to traverse the knowledge graph or a subset thereof to determine both nodes that branch outward from (representing advanced subject items for) each learning node. In some embodiments, the depth-first traversal may operate in the basic direction from a designated node or a node on the learning path, by assuming, for the purposes of the traversal, that the direction of all edges in the basic direction are reversed (i.e. traversing backwards in the basic direction). As shown in GUI 1300, outward branching nodes may be displayed below the corresponding learning node, while inward branching nodes may be displayed above the corresponding learning node.

In some embodiments, nodes proximate to more than one learning path node may be displayed alongside the nodes occurring earlier on the learning path rather than later nodes. In other implementations, nodes on the learning path may be positioned on a vertical line, with associated nodes not on the learning path positioned to the right and left of the line (instead of the exemplary above and below configuration shown in FIGS. 13A and 13B).

In some embodiments, GUI 1300 may facilitate interactive rearrangement and/or modification of nodes on learning path 1320. For example, as shown in FIG. 13B, nodes may be dynamically added and removed from the learning path in an interactive fashion, for example, via drag and drop or other UI operations. In some embodiments, the layout of the graph may be recalculated and/or updated after the learning path is changed. In one implementation, when dragging a node that is not originally on the learning path to the learning path, GUI 1300 may display a dragging of one or more nodes directly or indirectly associated with the node being dragged thereby providing a user with a visual indication of any graph layout changes associated with the learning path modification.

Further, GUI 1300 may facilitate changes to learning path 1320. FIG. 13B illustrates the removal of node 1307 from learning path 1320 to create a new learning path 1340. Because node 1307 is an advanced subject item for node 1303, in the new layout, as shown in FIG. 13B, node 1307 now appears below node 1303, connected by edge 1345. Further, nodes 1308, 1309 and 1310, which are connected to node 1307, appear at a lower level relative to node 1307.

In general, GUI 1300 may facilitate modification of learning paths 1320 (FIG. 13A) and/or 1340 (FIG. 13B). For example, one or more nodes may be removed from and/or added to learning paths 1320 and/or 1340. Further, GUI 1300 may also facilitate rearrangement of the order in which nodes appear on learning paths 1320 and/or 1340.

Figure 14A:
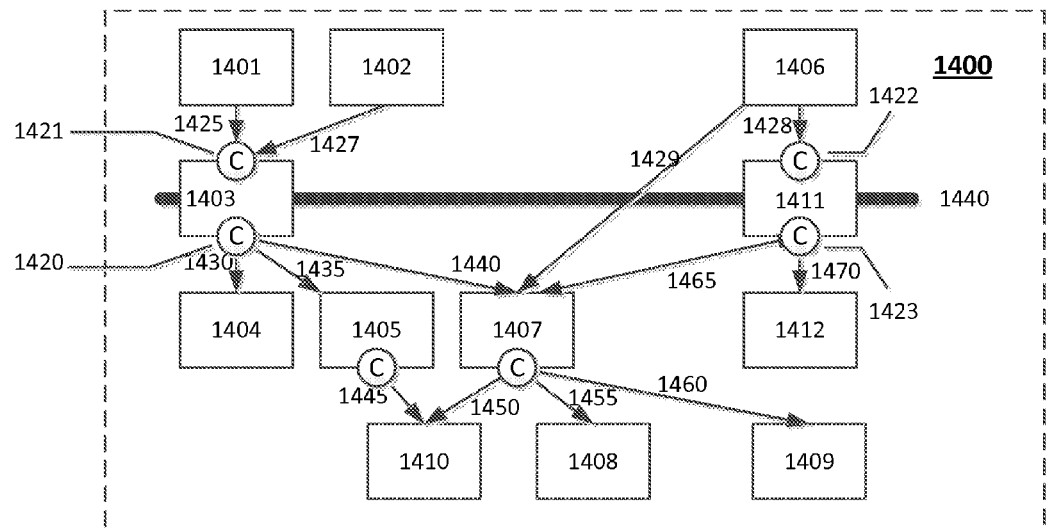
FIGS. 14A-14C show an exemplary graphical user-interface (GUI) 1400 for visualization and interaction with a knowledge base.
Figure 14B:
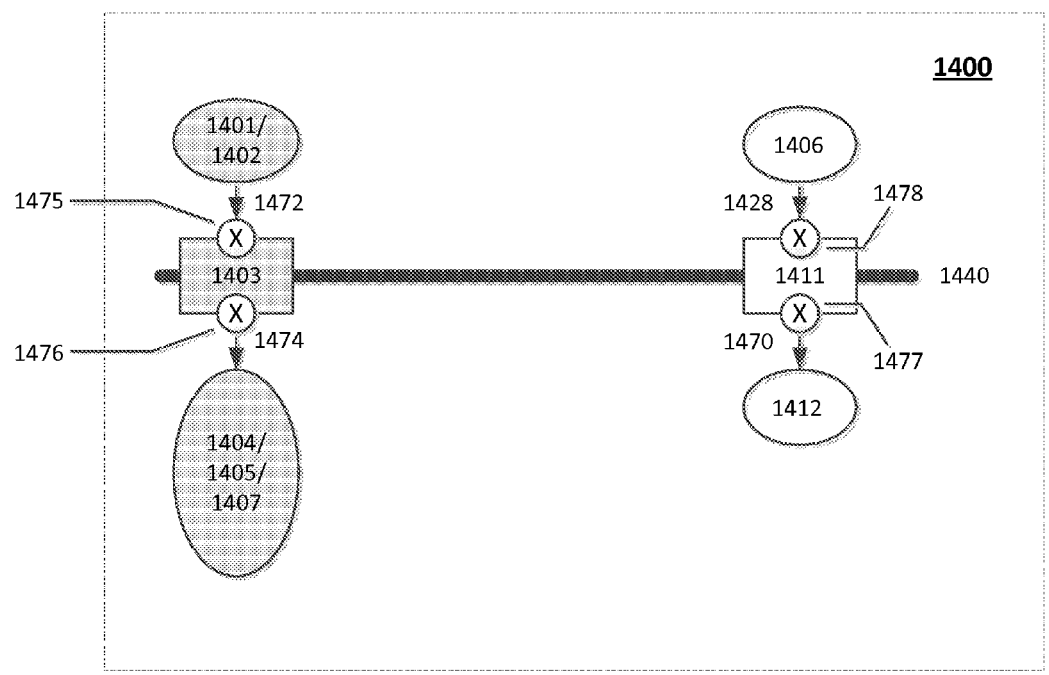
Figure 14C:
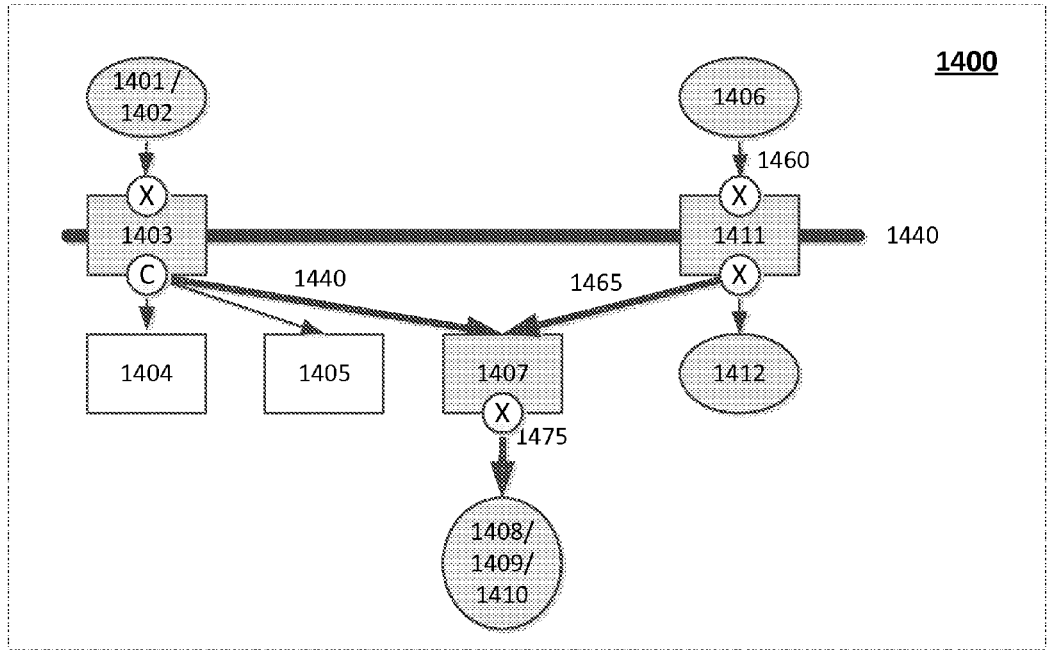

FIGS. 14A-14C show an exemplary graphical user-interface (GUI) 1400 for visualization and interaction with a knowledge base. In some embodiments, GUI 1400 may limit the portion knowledge graph displayed. For example, in one embodiment, GUI 1400 may limit the portion of knowledge graph displayed by showing those subject items closely associated with items on the learning path 1440, such as, for example, subject items directly connected to nodes on learning path 1440.

As shown in FIG. 14A, in GUI 1400, node 1403 is connected to basic subject items 1401 and 1402, while nodes 1407 and 1411 have node 1406 as a basic subject item. Further, nodes 1404 and 1405 are advanced subject items for node 1403, while node 1412 is an advanced subject item for node 1411. Nodes 1408, 1409 and 1410 are advanced subject items for node 1407. Node 1410 is also an advanced subject item for node 1405.

In some embodiments, various parameters may be used to configure to what extent an item must be associated to a learning path item in order to be displayed. One procedure by which nodes can be associated with learning path nodes is a depth-first traversal. In some embodiments, the learning path nodes are considered sequentially, in the order they appear in the path.

In some embodiments, for each learning path node, a recursive depth-first traversal may be performed in the advanced direction, so that advanced subject items linked to the learning path node may be associated with each other, thus forming a set of advanced subject items linked to the learning path node. As the traversal proceeds in the advanced direction, any advanced subject items that are linked to any previously associated nodes may be associated with each other to form additional sets of associated nodes. The depth-first traversal in the advanced direction may thus be performed recursively from each set of associated nodes.

In some embodiments, a similar recursive depth-first traversal may then be performed in the basic direction for each learning path node. For the purposes of the depth-first traversal in the basic direction, the directions of edges are assumed to be reversed. As a consequence of the recursive depth-first traversal of the basic node subgraph, basic nodes are associated into sets, where each set is linked to a learning path node or to another set.

The recursive depth-first traversal and node association procedure may continue in the basic and advanced directions for subsequent nodes in the learning path. In some embodiments, a list of nodes associated with each learning path node is maintained, so that once a node is associated with one learning path node, the depth-first traversal may exclude that node from association with another learning path node.

Parameters may be provided to a recursive depth-first traversal and node association procedure, to specify, for example, a maximum node depth, which may be based on the number of edges traversed by the depth-first traversal in a path to the node. As another example, the depth-first traversal may depend on attributes or properties associated with a node. For example, a node may be designated as "terminal node" or an "intermediate node" in the advanced direction and/or the basic direction. For example, if a node is a "terminal node" in the advanced (or basic) direction then a depth-first traversal in the advanced (or basic) direction may stop at the terminal node (even if there are more advanced (or basic) nodes linked to the terminal node). On the other hand, if a node is designated an "intermediate node" in the advanced (or basic) direction, then a depth-first traversal in the advanced (or basic) direction may continue to traverse nodes more advanced (or basic) than the intermediate node (unless there are no further advanced or (basic) nodes linked to the intermediate node in the advanced (or basic) direction). By changing the values of properties associated with a node, e.g. by designating nodes as terminal or intermediate, sections of a knowledge graph that are processed and/or displayed may be managed.

In some embodiments, GUI 1400 may allow edges connected to a node to be collapsed and/or exploded in the advanced direction and/or the basic direction. In some embodiments, the collapse and explode operators may be used on nodes in a learning path or connected to a learning path. In some embodiments, the underlying knowledge graph may not be affected by the merge, collapse, explode and/or other visualization operations, instead, visual or displayed representations of the knowledge graph may be changed as a consequence of activating the merge, collapse, explode and/or other visualization operators. For example, in FIG. 14A, clicking on or activating collapse operator "C" 1421 prevents explicit display of items 1401 and 1402. Likewise, collapsing 1422 hides 1406, collapsing 1423 hides 1412, and collapsing 1420 hides 1404, 1405, 1407, 1410, and 1408. When a node is hidden, edges connected to that node are hidden as well. For example, collapsing 1422 would hide 1406, causing edges 1429 and 1428 to be hidden.

FIG. 14B shows the consequence of collapsing 1420, 1421, 1422, and 1423 in FIG. 14A. Explode operators 1475, 1476, 1477, and 1478 are now available that reverse the effect of the collapse operators. For example, clicking on or activating explode operator X 1475 switches the character of node 1403 from "terminal" to "intermediate" in the basic direction, making nodes 1401 and 1402, as well as edges 1425 and 1427, visible. Conversely, use of collapse operator C 1421 switches the character of node 1403 from "intermediate" to "terminal" in the basic direction, collapsing nodes 1401 and 1402 into node 1401/1402 and merging edges 1425 and 1427 into edge 1472.

In some embodiments, if a node has a "terminal" property in a specified direction, a "preview node" may be made available which may provide a summary of node visibility information. For example, the preview may provide an indication of how the nodes that would be made visible upon expansion. The preview node may display a visualization of one of these would-be visible nodes; a condensed summary of a subset of the would-be visible nodes; and/or metrics relating to the number or character of the would-be visible nodes. The would-be visible nodes may include nodes directly and/or indirectly connected to the terminal node. In some embodiments, tapping or clicking on a "preview node" may have the effect of activating an explode operator.

In one implementation, if a node is terminal in a given direction (outbound or inbound), a "preview node" or preview window may be displayed to illustrate the nodes that would be made visible upon expansion. The preview node may display a visualization of one of these would-be visible nodes; a summarized view from a subset of the would-be visible nodes; and/or metrics relating to the number or character of the would-be visible nodes. The would-be visible nodes may include nodes directly and/or indirectly connected to the terminal node. Tapping on the preview window and/or a specific node in the preview node, and/or the "X" explode operator may cause the node to be expanded in that direction; tapping on an "C" icon or collapse operator inset onto the node in a given direction may cause the node to be collapsed in that direction.

FIG. 14C illustrates the consequence of clicking on or activating explode operator 1476. In one embodiment, as shown in FIG. 14C, nodes 1404, 1405, and 1407 are displayed; node 1407 has a terminal property in the advanced direction, so nodes 1408, 1409, and 1410 are hidden, though preview or collapsed node 1408/1409/1410 may be visible. In another embodiment (not shown), clicking on or activating explode operator 1476 may cause the associated set of nodes to acquire "intermediate" character in the advanced direction, so that nodes 1404, 1405, 1407, 1408, 1409, and 1410 all become visible. In general, nodes and/or edges may be converted back and forth between collapsed and exploding modes by tapping on them and/or user interface elements associated with various subject items, enabling the user to readily expand and collapse portions of the graph. In some embodiments, each node may have "exploding" and/or "terminal" properties specified in two directions: one for outward emanating edges, and one for inward feeding edges. Thus, FIG. 14B shows the effect of having edges of nodes 1403 and 1411 collapsed in both inward (basic) and outward (advanced) directions, while FIG. 14C shows the effect of having node 1503 expanded in the outward direction.

Figure 14D:
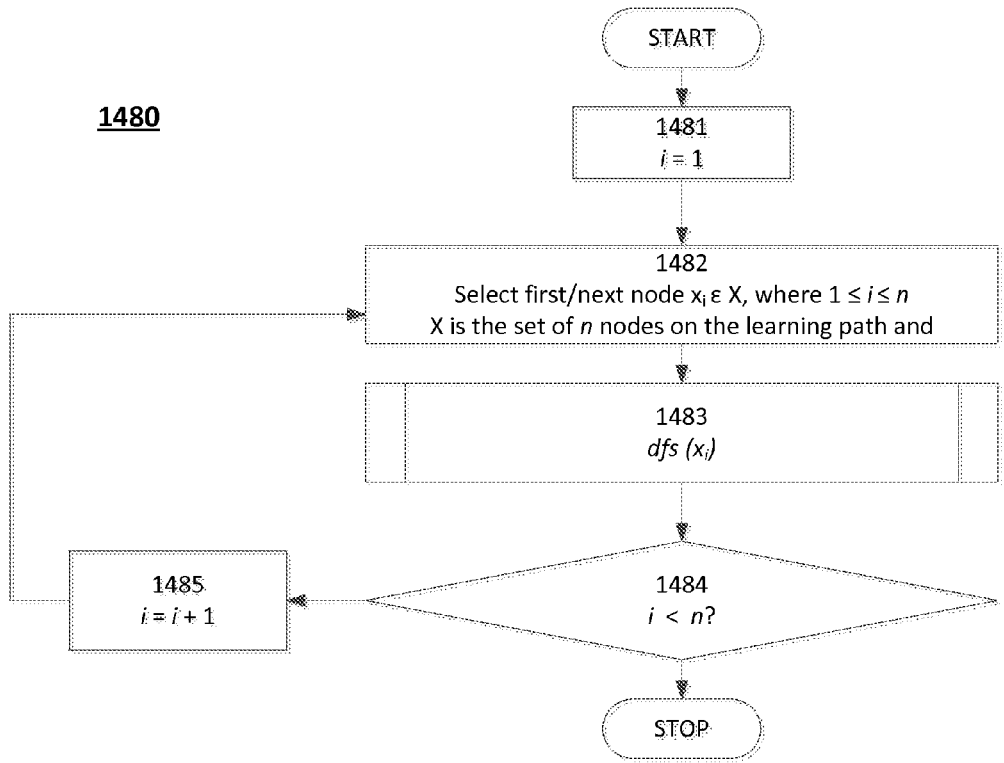
FIGS. 14D and 14E show a flowchart of an exemplary method for implementing one or more visualizations shown in FIGS. 14A-14C.
Figure 14E:
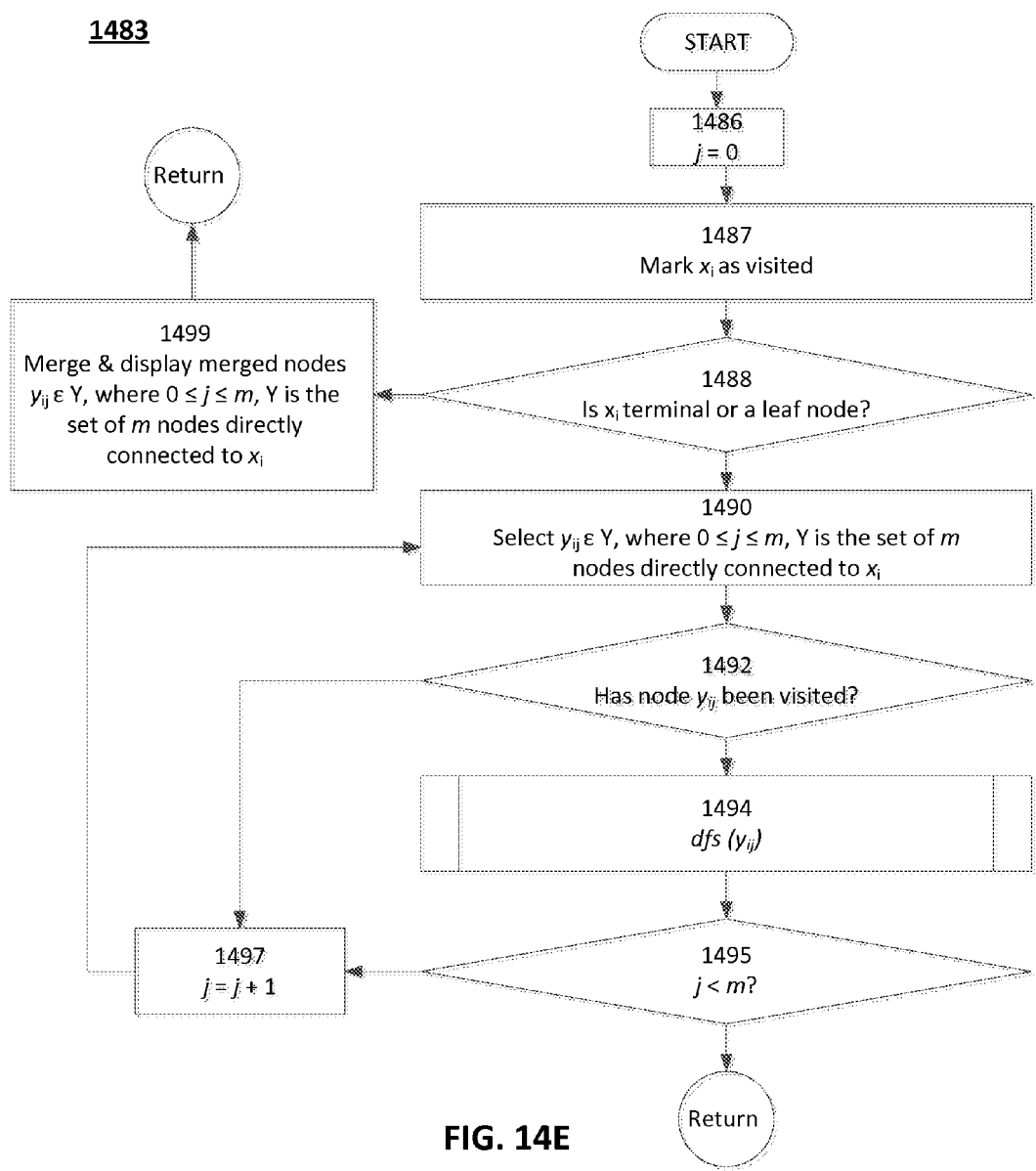

FIGS. 14D and 14E show a flowchart of an exemplary method to facilitate implementation of the collapse and explode operators and one or more other interactive techniques discussed herein. In some embodiments, method 1480 may be performed by computing device 4. In some embodiments, method 1480 may be performed when subject items are added and/or deleted, dependencies in the knowledge base are changed and/or when the nodes on the learning path are changed. In some embodiments, for a node on the learning path, method 1480 may be performed: (i) in the advanced direction following the directed edges; and, (ii) in the basic direction, by traversing backward along the directed edges or assuming a reversed direction for each edge in the basic subgraph associated with the node on the learning path. In step 1481, a learning path node counter i may be initialized to 1.

In step 1482, the first (or next) node on the learning path may be selected. For example, the set X of nodes on the learning path may be determined and a first (next) node $x_i \in X$ may be selected, where $1 \leq i \leq n$ and n is the cardinality of set X.

In step 1483, recursive depth-first traversal routine 482 may be invoked with the node $x_i$.

Next, in step 1484, the learning path node counter i is compared with n. If i<n, ("Y" in step 1484) then, in step 1485, learning path node counter i is incremented, and another iteration is commenced in step 1482, where the next learning path node $x_i$ is selected. If all nodes have been processed ("N" in step 1484) then, method 1480 terminates.

FIG. 14E shows recursive depth-first traversal routine 1483. In step 1486, connected node counter j is initialized to 0. Next, in step 1487, learning path node $x_i$ is marked as "visited". In step 1488, the properties of learning path node $x_i$ are examined. If learning path node $x_i$ is terminal ("Y" in step 1488), then, in step 1499, the set Y of nodes $y_{ij}$ directly connected to learning path node $x_i$ may be determined and merged, and the merged node may be displayed and control returns to the calling routine.

For example, referring to FIG. 14A, when a user clicks collapse operators "C" 1420 and/or 1421, node 1403 is designated as terminal. Clicking on or activating collapse operator "C" 1421 may merge or collapse subject items 1401 and 1402 and hide edges 1425 and 1427. Likewise, activation of collapse operator 1420 may result in merging or collapsing nodes 1404, 1405, and 1407 and hiding edges 1430, 1435 and 1440. In some embodiments, because node 1403 is terminal, nodes below nodes 1404, 1405 and 1407 are not displayed.

Referring to FIG. 14E, if learning path node $x_i$ is intermediate (not terminal) ("N" in step 1488), then, in step 1490, first or next node $y_{ij} \in Y$ may be selected, where $1 \leq j \leq m$ and m is the cardinality of set Y, where Y is the set of nodes $y_{ij}$ directly connected to learning path node $x_i$.

In step 1492, if node first or next node $y_{ij} \in Y$ has been previously marked as visited ("Y" in step 1492), then, in step 1497, counter j is incremented, and another iteration is commenced in step 1490, where the next node $y_{ij}$ directly connected to $x_i$ is selected.

In step 1492, if node first or next node $y_{ij} \in Y$ has not been previously marked as visited ("N" in step 1492), then, in step 1494, depth-first routine 1483 is recursively invoked with the parameter next node $y_{ij}$.

In step 1495, if all nodes in Y have been processed ("Y" in step 1495), then, control returns to the calling routine. In step 1495, if there are additional unprocessed nodes in Y ("N" in step 1495), then, in step 1497, counter j is incremented, and another iteration is commenced in step 1490, where the next node $y_{ij}$ directly connected to $x_i$ is selected.

Referring to FIG. 14C, for example, nodes 1404, 1405, and 1407 are displayed; node 1407 has a terminal property in the advanced direction, so nodes 1408, 1409, and 1410 are hidden, though preview or collapsed node 1408/1409/1410 may be visible. In another embodiment (not shown), clicking on or activating explode operator 1476 may cause the associated set of nodes to acquire "intermediate" character in the advanced direction, so that nodes 1404, 1405, 1407, 1408, 1409, and 1410 all become visible as shown in FIG. 14A.

Figure 15A:
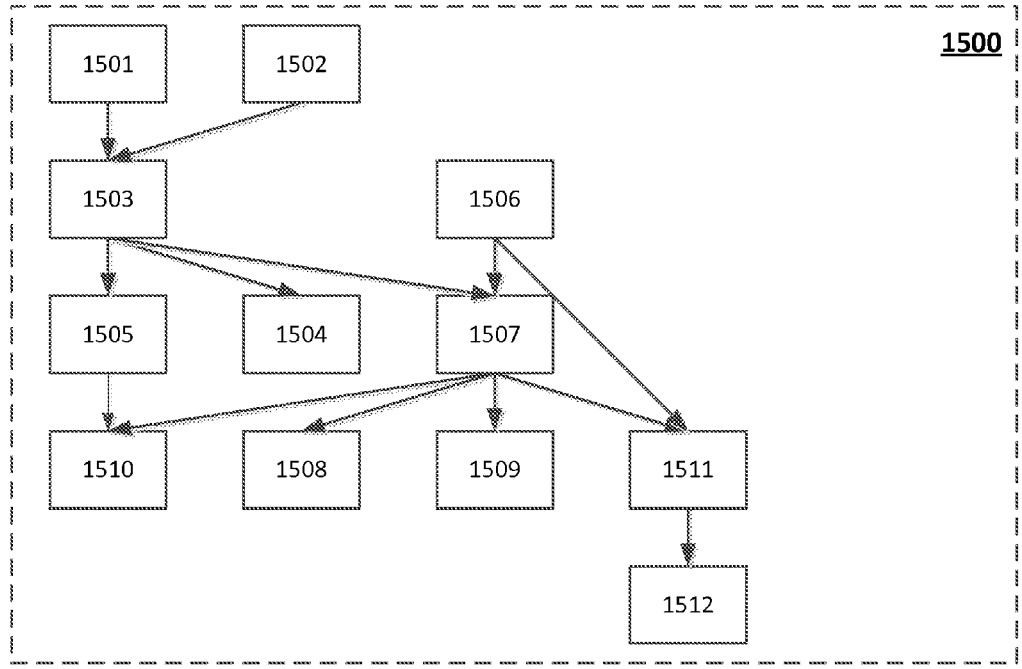
FIGS. 15A-15C show an exemplary graphical user-interface (GUI) 1500 for visualization and interaction with a knowledge base.
Figure 15B:
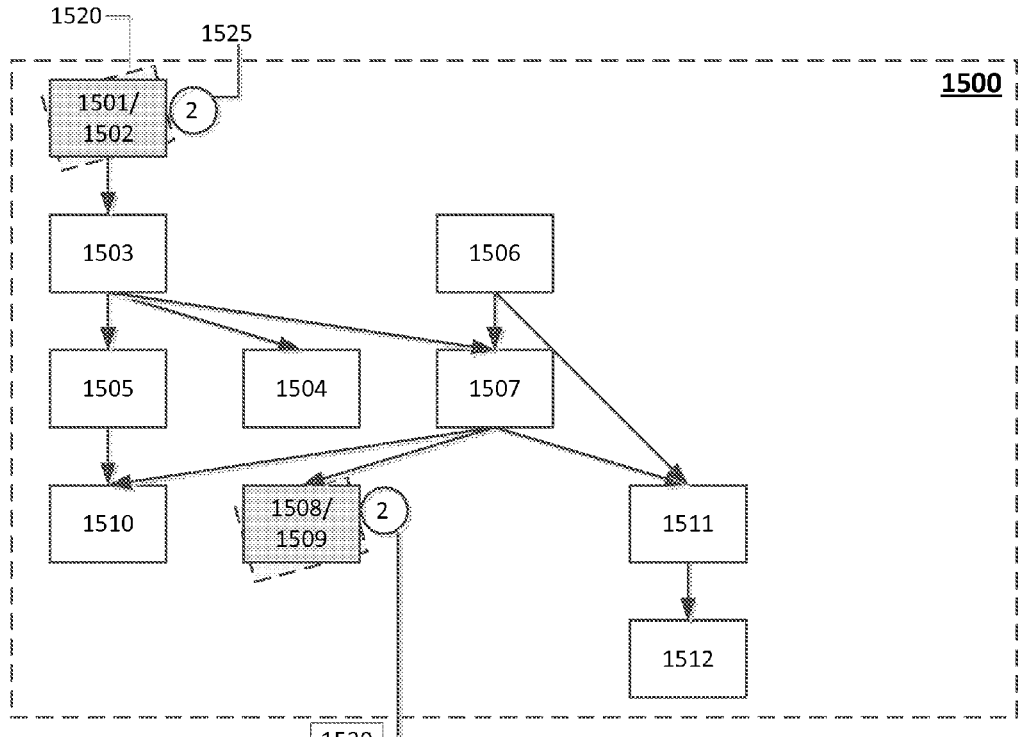
Figure 15C:
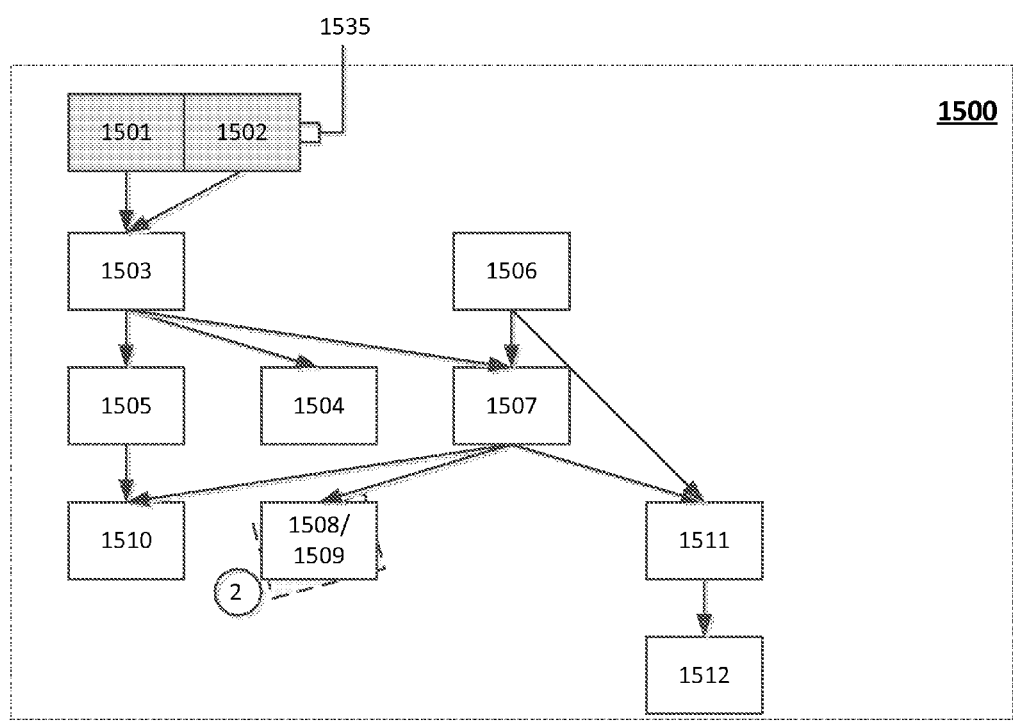

FIGS. 15A-15C show an exemplary graphical user-interface (GUI) 1500 for visualization and interaction with a knowledge base, where the visualization of a knowledge graph is condensed by having nodes of similar connectivity merge or stack atop each other. In exemplary GUI 1500, the nodes 1501, 1502 . . . 1512 are shown as rectangles.

In general, the displayed representation of a node may comprise any distinguishing symbol, such a geometric shape, picture, icon, a thumbnail image, and/or a textual or non-textual (e.g. video, multi-media) summary of node content may be used to represent nodes. A common difficulty encountered with visualizing large graphs is that the display may become cluttered, so that the relationships between nodes may be obscured or unclear. Therefore, disclosed embodiments, such as exemplary GUI1500, facilitate interaction with and manipulation of the knowledge graph.

In FIGS. 15A and 15B, knowledge graph comprises nodes 1501 and 1502 are basic subject items for nodes 1503, which, in turn, is a basic subject item for nodes 1504, 1505 and 1507. Node 1506 is also a basic subject item for node 1507. Nodes 1508, 1509, 1510 and 1511 are advanced subject items for node 1507. Node 1510 is also an advanced subject item for node 1505. Further, node 1512 is an advanced subject item for node 1511.

In some embodiments, a connectivity pattern for some subset of nodes in the knowledge graph may be determined. For example, a connectivity pattern for each displayed node and/or some subset thereof may be determined. For example, GUI 1500 may facilitate selection of an area where connectivity patterns for nodes may be determined. In some embodiments, the connectivity pattern for a node may be determined offline and stored as a node characteristic.

For example, in one implementation, UIDs may be associated with and/or assigned to each node/subject item, and a connectivity pattern may be defined by using a hash function. In one embodiment, the hash function for a first node may take as input, the UIDs of the set of nodes that connected to the first node. If the output of the hash function for a set of nodes is the same, then those nodes may be considered to have a similar connectivity pattern. In some embodiments, nodes with similar connectivity patterns may be merged for display or stacked atop each other.

In some embodiments, each node may be associated with a corresponding set of connected nodes and/or a set of UIDs of connected nodes. If for a set of nodes, the intersection of corresponding sets of connected nodes exceeds a threshold, then those nodes may be considered to have similar connectivity patterns. In some embodiments, the threshold for a set of nodes may be determined based, in part, on one or more of: (a) the average cardinality of the corresponding sets of connected nodes (b) the maximum cardinality of the corresponding sets of connected nodes, or (c) a function of the cardinality of the sets of connected nodes. The cardinality of a set is the number of elements in the set. The set of corresponding connected nodes for node 1501 is 1503. Similarly, the set of corresponding connected nodes for set 1502 is also 1503. Therefore, nodes 1501 and 1502 may be considered to have similar connectivity patterns.

As shown in FIG. 15A, nodes 1501 and 1502 are both connected to node 1503, while nodes 1508 and 1509 are both connected to node 1507. Therefore, the connectivity patterns for nodes 1501 and 1502 are similar and the connectivity patterns for nodes 1508 and 1509 are similar. Accordingly, as shown in FIG. 15B, in GUI 1500, nodes 1501 and 1502 (from FIG. 15A) have been merged into node 1501/1502 (in FIG. 15B); and nodes 1508-1 and 1509-1 (from FIG. 15A) have been merged into node 1508/1509 (in FIG. 15B). In some embodiments, a visual indication 1520 (e.g. by shading and/or a skewed dashed rectangle) of merged nodes may be shown. In some embodiments, an indication of the number of merged nodes, underlying an icon or another visual representation of the merged node may be shown. For example, as shown in FIG. 15B, in GUI 1500, indicators 1525 and 1530 for merged nodes 1501/1502 and 1508/1509, respectively, indicate that the merged nodes include two underlying nodes. In some embodiments, nodes may be labeled with a listing of the merged nodes. In some embodiments, the number of underlying nodes may be reflected in the size of a merged node relative to other nodes.

Further, as shown in FIG. 15C, in some embodiments, GUI 1500 may facilitate node splitting or destacking. For example, nodes 1501 and 1502 have been split or destacked. In some embodiments, GUI 1500 may facilitate user scrolling of merged or stacked nodes. For example, a gesture such as selecting, clicking, tapping or swiping may be used to destack or split merged nodes. In some embodiments, stacked nodes may be destacked via user interface operations, which may include dragging a node (e.g. node 1500 in FIG. 15C) off from the top of merged/stacked node 1501/1502 (in FIG. 15B). In some embodiments, UI element 1535 may be dragged and/or otherwise used to return nodes 1501 and 1502 (in FIG. 15C) to the configuration shown in FIG. 15A.

Figure 16A:
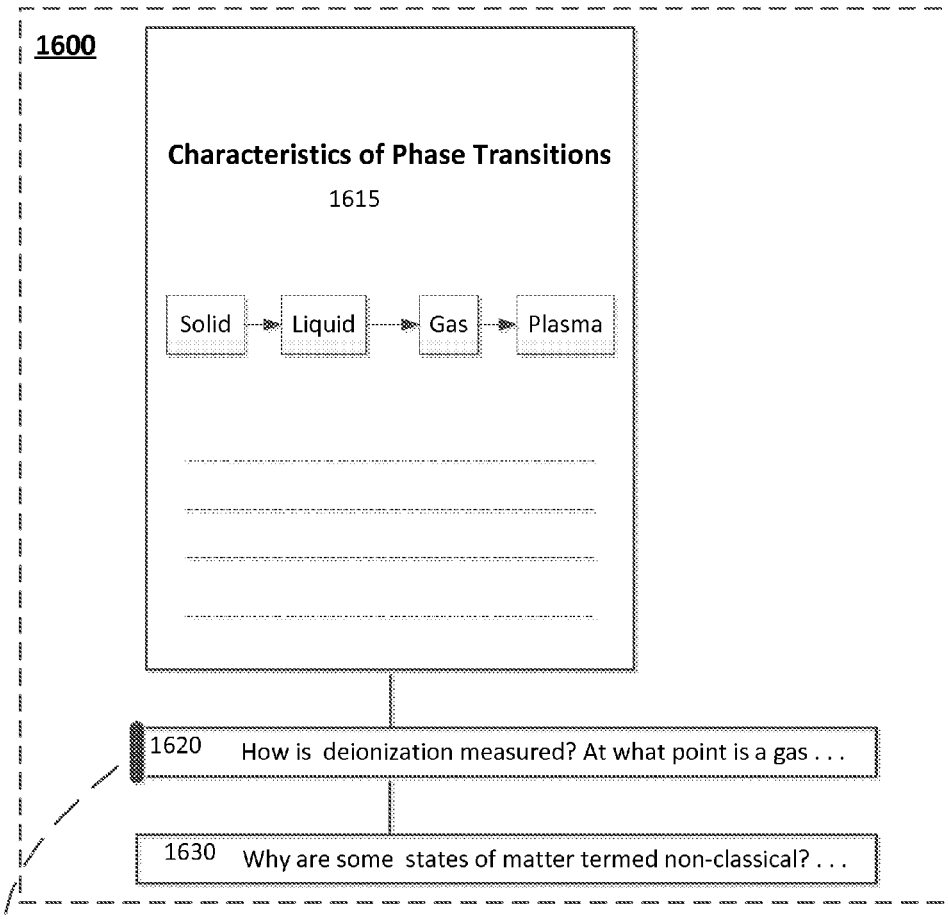
FIGS. 16A and 16B show an exemplary GUI 1600 for an interactive presentation oriented display of nodes in a knowledge base.
Figure 16B:
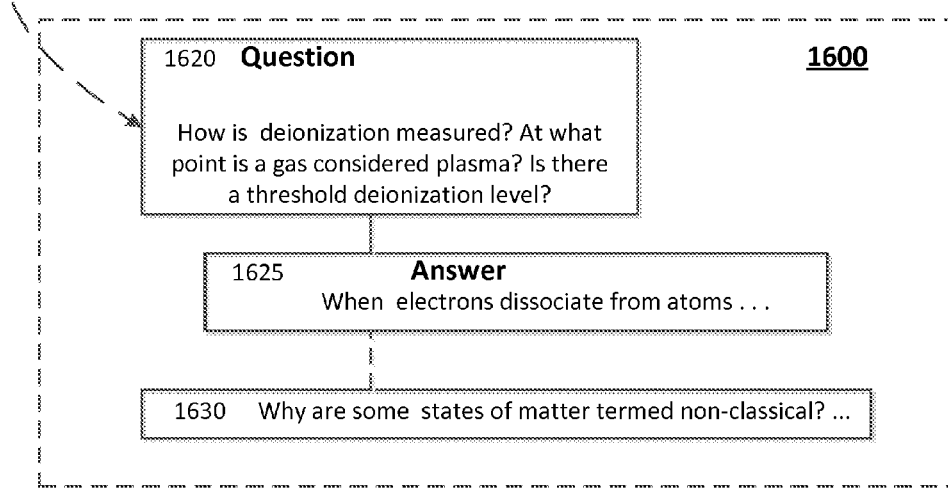

FIGS. 16A and 16B show an exemplary GUI 1600 for an interactive presentation-oriented display of nodes in a knowledge base. In some embodiments, as shown in FIG. 16A, in a presentation mode, path nodes such node 1615 "Characteristics of Phase Transitions" may be displayed as full-sized cards, while nodes directly or indirectly connected to path cards such as nodes 1620 and 1630 may be displayed above and below the path nodes in a summarized format. For example, as shown in FIG. 16A, the nodes connected to subject item 1615 pertain to a several questions about the subject item. For example, node 1620 shows a question related to slide 1615, "How is deionization measured? At what point is a gas . . . ", which is shown in summarized format. Similarly, node 1630, which is also summarized, is also related to slide 1615, and is a question: "Why are some states of matter termed non-classical? . . . "

In one implementation, summarized nodes can be expanded into full-size nodes by tapping on them, and shrunken back down into summarized nodes by tapping on the full-size nodes. For example, as shown in FIG. 16B, when subject item 1620 is activated, the entire slide is shown revealing the full question in node 1620 may be displayed, which asks, "How is deionization measured? At what point is a gas considered plasma? Is there a threshold deionization level?" Further, when node 1620 is activated, an answer node 1625 may be shown attached to node 1620, as well as any other questions or answers related directly to node 1620 and/or 1625. In one possible layout, as shown in FIG. 16B, the summarized nodes are displayed as a list, with the level of indentation of each node determined by the number of edges separating the summarized node from the path node. Node 1630 may continue to be shown below node 1625. In one implementation, making a summarized node full-size causes summarized nodes attached to the now-full-size node to be displayed above and below the now-full-size node.

It should be noted that the examples provided above are for explanatory purposes only and many other variations of disclosed embodiments are possible and envisaged. For example, a variety of methods and/or models may be used to: measure student interest and degree of comprehension; predict how student understanding and interest changes with time; compute the priorities of items, and to determine the order in which items are presented; tie student interest to changes in linkage strengths and item priority; use results of tests and other external evaluation metrics to determine understanding levels, priority values, etc.; permit multiple subject items to be active simultaneously; permit user collaboration in adding, modifying, and removing content from the knowledge base, etc. In some embodiments, the user interface may be extended to enable more detailed control over program parameters and enhanced visualization of knowledge base content.

Other embodiments will be apparent to those skilled in the art from consideration of the specification and practice of one or more embodiments of the invention disclosed herein. It is intended that the specification and examples be considered as exemplary only, with a true scope and spirit of the being indicated by the following claims.

What is claimed is:

1. A processor-implemented method for displaying content associated with a plurality of linked subject items in a knowledge base, the method comprising:

obtaining and displaying a learning path comprising an ordered set of subject items in the knowledge base, determining a set of linked subject items comprising at least one of a set of basic subject items or a set of advanced subject items, wherein each subject item in the set of linked subject items is linked to at least one subject item on the learning path, and displaying representations of a subset of the linked subject items selected from the set of linked subject items, wherein the displayed representation for a first subject item in the subset is determined based, in part, on at least one of:

a proximity of the first subject item to one or more subject items on the learning path, or a value of a first property associated with the first subject item, or a value of a second property associated with a second subject item directly linked to the first subject item.

2. The method of claim 1, wherein the displayed representation of the first subject item is determined based on:
the second property, wherein the value of the second property is terminal, and the displayed representation is obtained by displaying a first representation of the first subject item when a second subject item directly linked to the first subject item is designated as terminal, wherein the second subject item is more proximate to a subject item on the learning path than the first subject item.

3. The method of claim 2, wherein displaying the first representation of the first subject item comprises:
determining a directly linked set of subject items comprising subject items directly linked to the second subject item, wherein subject items in the directly linked set are less proximate than the second subject item; and
displaying a representation of the directly linked set linked to the second subject item.

4. The method of claim 1, wherein the displayed representation of the first subject item is determined based on:
the first property, wherein the value of the first property is intermediate, and the displayed representation comprises a symbol associated with the first subject item.

5. The method of claim 1, wherein the displayed representation of the first subject item is determined based on the proximity of the first subject item to a subject item on the learning path being lower than a proximity threshold, and wherein:
the subset of linked subject items comprises subject items more proximate to at least one subject item on the learning path than the proximity threshold; and
the displayed representation of the first subject item comprises a first symbol associated with the first subject item, the first symbol being displayed in conjunction with the display of a plurality of symbols associated with the subset of linked subject items.

6. The method of claim 1, further comprising:
displaying an operator corresponding to the displayed representation of the first subject item, wherein the operator changes an existing value of the first property.

7. The method of claim 6, further comprising:
upon activation of the operator, changing the displayed representation of the first subject item based, in part, on the changed value of the first property.

8. The method of claim 1, wherein the displayed representation of the first subject item further comprises:
display of a subject tag associated with the first subject item, and
displaying, upon selection of the subject tag, a representation of a cluster of subject items in the knowledge base associated with the subject tag.

9. The method of claim 1, further comprising:
dynamically updating, upon modification of the learning path by the addition or removal of one or more subject items, the set of linked subject items linked to at least one subject item on the modified learning path, and
displaying representations of an updated subset of the linked subject items selected from the updated set of linked subject items.

10. An apparatus comprising:
a memory to hold a knowledge base comprising a plurality of subject items;
a display; and
a processor coupled to the memory and the display, wherein the processor is configured to:
obtain a learning path comprising an ordered set of subject items in the knowledge base,
determine a set of linked subject items comprising at least one of a set of basic subject items or a set of advanced subject items, wherein each subject item in the set of linked subject items being linked to at least one subject item on the learning path, and
display, on the display, the learning path and representations of a subset of the linked subject items selected from the set of linked subject items, wherein the displayed representation for a first subject item in the subset is determined based, in part, on at least one of:
a proximity of the first subject item to one or more subject items on the learning path, or
a value of a first property associated with the first subject item, or
a value of a second property associated with a second subject item directly linked to the first subject item.

11. The apparatus of claim 10, wherein the processor is configured to determine the displayed representation of the first subject item is based on:
the second property, wherein the value of the second property is terminal, and the displayed representation is obtained by displaying a first representation of the first subject item when a second subject item directly linked to the first subject item is designated as terminal, wherein the second subject item is more proximate to a subject item on the learning path than the first subject item.

12. The apparatus of claim 11, wherein to display the first representation of the first subject item, the processor is configured to:
determine a directly linked set of subject items comprising subject items directly linked to the second subject item, wherein subject items in the directly linked set are less proximate than the second subject item; and
display a representation of the directly linked set linked to the second subject item.

13. The apparatus of claim 10, wherein the processor is configured to determine the displayed representation of the first subject item based on:
the first property, wherein the value of the first property is intermediate, and the displayed representation comprises a symbol associated with the first subject item.

14. The apparatus of claim 10, wherein the processor is configured to determine the displayed representation of the first subject item based on the proximity of the first subject item to a subject item on the learning path being lower than a proximity threshold, and wherein:
the subset of linked subject items comprises subject items more proximate to at least one subject item on the learning path than the proximity threshold; and
the displayed representation of the first subject item comprises a first symbol associated with the first subject item, the first symbol being displayed in conjunction with the display of a plurality of symbols associated with the subset of linked subject items.

15. The apparatus of claim 10, wherein the processor is further configured to:
display an operator corresponding to the displayed representation of the first subject item, wherein the operator changes an existing value of the first property; and
change, upon activation of the operator, the displayed representation of the first subject item based, in part, on the changed value of the first property.

16. The apparatus of claim 10, wherein to determine the displayed representation of the first subject item, the processor is further configured to:

display of a subject tag associated with the first subject item, and display, upon selection of the subject tag, a representation of a cluster of subject items in the knowledge base associated with the subject tag.

17. The apparatus of claim 10, processor is further configured to:

dynamically update, upon modification of the learning path by the addition or removal of one or more subject items, the set of linked subject items linked to at least one subject item on the modified learning path, and display representations of an updated subset of the linked subject items selected from the updated set of linked subject items.

18. The apparatus of claim 10, wherein the processor is further configured to:

determine an advanced connectivity pattern and/or a basic connectivity pattern for each subject item in the subset of the linked subject items; and display the subset of subject items, wherein subject items in the subset with a similar basic connectivity pattern or a similar advanced connectivity pattern are displayed using a condensed representation indicative of the connective pattern similarity.

19. The apparatus of claim 10, wherein the apparatus is one of:

a smartphone;
a tablet computer;
a handheld device;
a notebook computer; or
a wearable computing device.

20. A non-transitory computer-readable medium comprising instructions, which when executed by a processor, perform steps in a method for displaying content associated with a plurality of linked subject items in a knowledge base, the steps comprising:

obtaining and displaying a learning path comprising an ordered set of subject items in the knowledge base, determining a set of linked subject items comprising at least one of a set of basic subject items or a set of advanced subject items, wherein each subject item in the set of linked subject items is linked to at least one subject item on the learning path, and displaying representations of a subset of the linked subject items selected from the set of linked subject items, wherein the displayed representation for a first subject item in the subset is determined based, in part, on at least one of:

a proximity of the first subject item to one or more subject items on the learning path, or a value of a first property associated with the first subject item, or a value of a second property associated with a second subject item directly linked to the first subject item.

* * * * *